US012793282B2

(12) United States Patent
Pang et al.

(10) Patent No.: US 12,793,282 B2
(45) Date of Patent: Nov. 10, 2026

(54) LEARNING-BASED POINT CLOUD GEOMETRY COMPRESSION FRAMEWORK

(71) Applicant: InterDigital VC Holdings, Inc., Wilmington, DE (US)

(72) Inventors: Jiahao Pang, New York, NY (US); Muhammad Asad Lodhi, New York, NY (US); Junghyun Ahn, New York, NY (US); Dong Tian, Wilmington, DE (US)

(73) Assignee: InterDigital VC Holdings, Inc., Wilmington, DE (US)

( * ) Notice: Subject to any disclaimer, the term of this patent is extended or adjusted under 35 U.S.C. 154(b) by 250 days.

(21) Appl. No.: 18/814,400

(22) Filed: Aug. 23, 2024

(65) Prior Publication Data

US 2026/0057560 A1 Feb. 26, 2026

(51) Int. Cl.
*G06T 9/00* (2006.01)
*G06T 9/40* (2006.01)

(52) U.S. Cl.
CPC ................ *G06T 9/002* (2013.01); *G06T 9/40* (2013.01)

(58) Field of Classification Search
CPC ............ G06T 9/002; G06T 9/40; H04N 19/96
See application file for complete search history.

(56) References Cited

U.S. PATENT DOCUMENTS

2017/0347122 A1* 11/2017 Chou ........................ G06T 9/00
2023/0075442 A1* 3/2023 Ma ........................ G06N 3/0455
2024/0020885 A1 1/2024 Lee et al.
2025/0045970 A1* 2/2025 Kwong .................. G06T 9/001
2026/0082089 A1* 3/2026 Pang ...................... H04N 19/13

OTHER PUBLICATIONS

Mao, Yixiang ("Learning to Predict on Octree for Scalable Point Cloud Geometry Coding", IEEE 5th International Conference on Multimedia Information Processing and Retrieval) (Year: 2022).*
Huang, Lila ("OctSqueeze: Octree-Structured Entropy Model for LiDAR Compression", Proceedings of the IEEE/CVF conference on computer vision and pattern recognition) (Year: 2020).*
Lodhi et al., "UniFHiD Part 1: InterDigital's answer to MPEG AI-PCC for Track 1 Geometry-only", 1SO/IEC JTC 1/SC 29/WG 7 m70282, Kemer—Nov. 2024, 32 pages.

(Continued)

*Primary Examiner* — Molly Wilburn
(74) *Attorney, Agent, or Firm* — Xiaoan Lu

(57) ABSTRACT

In one implementation, geometry of a point cloud is encoded/decoded. On the encoder side, the encoder determines a first feature representing a voxel occupancy status of a current level and/or one or more finer levels of the point cloud, based on the voxel occupancy status of the current level and/or the finer levels; determines a second feature representing prediction of the voxel occupancy status of the current level and/or the finer levels of the point cloud; determines a third feature associated with the voxel occupancy status of the current level and/or the finer levels, based on the first feature and the second feature; and encodes the third feature. On the decoder side, the first feature is decoded from a bitstream, the second feature is determined similarly as the encoder side, and the third feature is determined based on the first feature and the second feature.

20 Claims, 16 Drawing Sheets

(56) References Cited

OTHER PUBLICATIONS

Siao-Yu Li et al., "Augmented Normalizing Flow for Point Cloud Geometry Coding", 2022 IEEE International Conference on Visual Communications and Image Processing (VCIP)/978-1-6654-7592-1/22/$31.00 © 2022 IEEE I DOI: 10.1109/VCIP56404.2022.100, 5 pages.
Wang J et al., "[AI-3DGC] (EE5.3-related] Dynamic SparsePCGC Update", 1SO/IEC JTC 1/SC 29/WG 7 m61006 Online—Oct. 2022, 7 pages.
Qi et al., "PointNet: Deep Learning on Point Sets for 3D Classification and Segmentation", Proceedings of the IEEE conference on computer vision and pattern recognition, Apr. 10, 2017, 19 pages.
Vaswani et al., "Attention is all you need", Advances in neural information processing systems 30 (2017), 15 pages.
Fu et al., "Octattention: Octree-based large-scale contexts model for point cloud compression", Proceedings of the AAAI conference on artificial intelligence, vol. 36. No. 1, May 8, 2022, 10 pages.
Achliptas et al., "Learning representations and generative models for 3d point clouds", International conference on machine learning. PMLR, Jun. 12, 2018, 18 pages.
Balle et al., "Variational Image Compression with a Scale Hyperprior", ICLR 2018 Conference Track, 6th International Conference on Learning Representations, Apr. 30, 2018, 47 pages.

* cited by examiner

LEARNING-BASED POINT CLOUD GEOMETRY COMPRESSION FRAMEWORK

INCORPORATION BY REFERENCE

The present application incorporates by reference in their entirety the following applications: U.S. patent application Ser. No. 18/679,144, entitled "An End-To-End Learning-Based Point Cloud Coding Framework" ("'144 application"), U.S. patent application Ser. No. 18/784,466, entitled "An End-To-End Learning-Based Dynamic Point Cloud Coding Framework" ("'466 application"), and U.S. patent applicant Ser. No. 18/654,987, entitled "Rate Control for Point Cloud Coding with a Hyperprior Model" ("'987 application").

BACKGROUND

The present application is related to point cloud compression and processing.

The Point Cloud (PC) data format is a universal data format across several business domains, e.g., from autonomous driving, robotics, augmented reality/virtual reality (AR/VR), civil engineering, computer graphics, to the animation/movie industry. 3D LiDAR (Light Detection and Ranging) sensors have been deployed in self-driving cars, and affordable LiDAR sensors are released from Velodyne Velabit, Apple ipad Pro 2020 and Intel RealSense LiDAR camera L515. With advances in sensing technologies, 3D point cloud data becomes more practical than ever and is expected to be an ultimate enabler in the applications discussed herein.

BRIEF SUMMARY

Briefly stated, in one embodiment, a method of encoding geometry of a point cloud is presented, comprising: determining a first feature representing a voxel occupancy status of at least one of a current level and one or more finer levels of the point cloud, based on the voxel occupancy status of the at least one of the current level and the one or more finer levels; determining a second feature representing prediction of the voxel occupancy status of the at least one of the current level and the one or more finer levels of the point cloud; determining a third feature associated with the voxel occupancy status of the at least one of the current level and the one or more finer levels, based on the first feature and the second feature; and encoding the third feature.

According to another embodiment, an apparatus for encoding geometry for a point cloud is presented, comprising one or more processors and at least one memory coupled to the one or more processors, wherein the one or more processors are configured to: determine a first feature representing a voxel occupancy status of at least one of a current level and one or more finer levels of the point cloud, based on the voxel occupancy status of the at least one of the current level and the one or more finer levels; determine a second feature representing prediction of the voxel occupancy status of the at least one of the current level and the one or more finer levels of the point cloud; determine a third feature associated with the voxel occupancy status of the at least one of the current level and the one or more finer levels, based on the first feature and the second feature; and encode the third feature.

In one embodiment, the first feature is directly determined from the current level.

In one embodiment, the first feature is obtained at a last level of feature-based coding by applying feature extraction consecutively on levels associated with the feature-based coding.

In one embodiment, the first feature is determined for each level of the point cloud based on a respective neural network, and wherein the respective neural networks are based on a same architecture and share a same set of network parameters.

In one embodiment, the first feature is determined for the point cloud based on a point-based neural network. In one embodiment, the point-based neural network uses the point cloud as input.

In one embodiment, the encoder further comprises obtains a fourth feature associated with a voxel occupancy status of a previously reconstructed level of the point cloud, wherein the encoding the third feature is based on a fourth feature. The encoder can further obtain a set of hyper-parameters based on the fourth feature, and wherein the encoding the third feature is based on the set of hyper-parameters. In one embodiment, the set of hyper-parameters is obtained further based on the voxel occupancy status of the previously reconstructed level.

In one embodiment, the current level corresponds to a level in the point cloud that is encoded with tree-based coding or a level in the point cloud that is encoded with feature-based coding.

In one embodiment, the obtaining the first feature comprises: obtaining a feature and a reconstructed version of a previously reconstructed level; and interpolating the feature to obtain the first feature based on the reconstructed version. In one embodiment, the interpolating is performed by a set of convolutional layers.

In one embodiment, the point cloud includes a first set of consecutive levels of the point cloud and a second set of consecutive levels of the point cloud, the second set of consecutive levels including a final level of the point cloud, wherein the encoding the third feature is performed for each level of the first set of consecutive levels and is not performed for any level of the second set of consecutive levels, and the obtaining the first feature is performed for each level of the first and second sets of consecutive levels.

In one embodiment, the second feature is based on at least one of an intra-predicted feature and an inter-predicted feature.

In one embodiment, the third feature is determined with a neural network.

In one embodiment, the encoder further obtains a reconstructed feature corresponding to the third feature, upsamples the reconstructed feature to obtain a feature vector for each voxel of the current level, determine an occupancy probability based on a corresponding feature vector for a current voxel to be encoded, and encodes the current voxel based on the occupancy probability.

In one embodiment, the encoder further augments the first feature based on a parameter controlling a tradeoff between a bit rate and quality.

In one embodiment, the encoder further selects a level of the point cloud and performs a training iteration for the selected level.

According to another embodiment, a method of decoding geometry of a point cloud is presented, comprising: decoding a first feature associated with a voxel occupancy status of at least one of a current level and one or more finer levels; determining a second feature representing prediction of the voxel occupancy status of the at least one of the current level and the one or more finer levels of the point cloud; and determining a third feature representing the voxel occupancy status of the at least one of the current level and the one or more finer levels of the point cloud, based on the first feature and the second feature.

According to another embodiment, an apparatus for decoding geometry for a point cloud is presented, comprising one or more processors and at least one memory coupled to the one or more processors, wherein the one or more processors are configured to: decode a first feature associated with a voxel occupancy status of at least one of a current level and one or more finer levels; determine a second feature representing prediction of the voxel occupancy status of the at least one of the current level and the one or more finer levels of the point cloud; and determine a third feature representing the voxel occupancy status of the at least one of the current level and the one or more finer levels of the point cloud, based on the first feature and the second feature.

In one embodiment, the third feature is determined with a neural network.

In one embodiment, the third feature is determined for each level of the point cloud based on a respective neural network, and wherein the respective neural networks are based on a same architecture and share a same set of network parameters.

In one embodiment, the first feature is determined for the point cloud based on a point-based neural network. In one embodiment, the point-based neural network uses the point cloud as input. In one embodiment, the encoder further obtains a fourth feature associated with a voxel occupancy status of a previously reconstructed level of the point cloud, wherein the decoding the third feature is based on a fourth feature. In one embodiment, the decoder further obtains a set of hyper-parameters based on the fourth feature, and wherein the decoding the third feature is based on the set of hyper-parameters. In one embodiment, the set of hyper-parameters is obtained further based on the voxel occupancy status of the previously reconstructed level.

In one embodiment, the current level corresponds to a level in the point cloud that is decoded with tree-based coding or a level in the point cloud that is decoded with feature-based coding.

In one embodiment, the point cloud includes a first set of consecutive levels of the point cloud and a second set of consecutive levels of the point cloud, the second set of consecutive levels including the final level of the point cloud, wherein the decoding the first feature is performed for each level of the first set of consecutive levels and is not performed for any level of the second set of consecutive levels, and the obtaining the first feature is performed for each level of the first and second sets of consecutive levels.

In one embodiment, the decoder further obtains a reconstructed feature from the third feature, upsamples the reconstructed feature to obtain a feature vector for each voxel of the current level, determines an occupancy probability based on a corresponding feature vector for a current voxel to be encoded, and decodes the current voxel based on the occupancy probability.

In one embodiment, the reconstructed feature is obtained at a last level of the point cloud by applying upsampling consecutively on levels associated with feature-based coding.

In one embodiment, the decoder further augments the third feature based on a parameter controlling a tradeoff between a bit rate and quality.

BRIEF DESCRIPTION OF THE DRAWINGS

The following detailed description will be better understood when read in conjunction with the appended drawings, in which there are shown examples of one or more of the multiple embodiments of the present disclosure. It should be understood, however, that the embodiments described herein are not limited to the precise arrangements and instrumentalities shown in the drawings. In the drawings.

DETAILED DESCRIPTION

Figure 1:
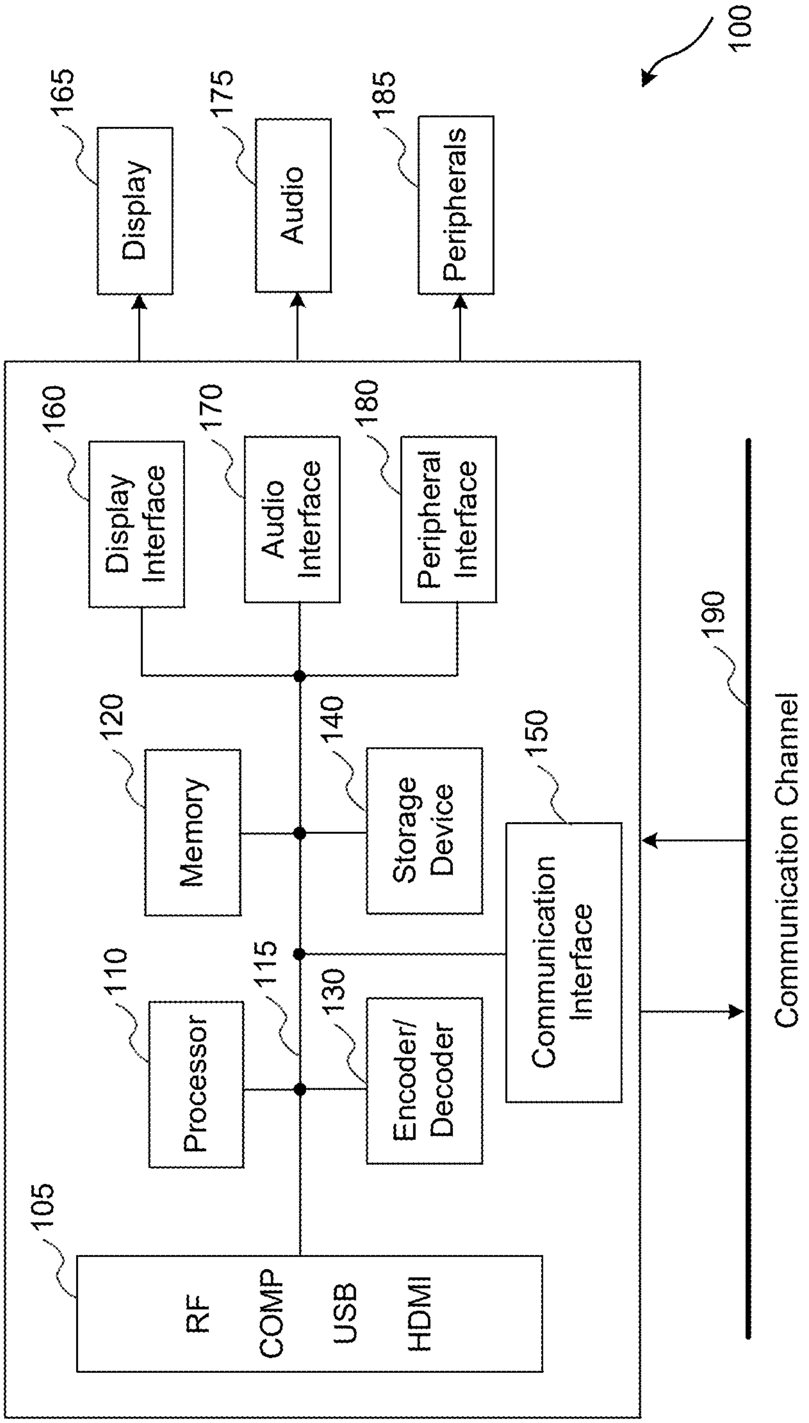
FIG. 1 illustrates a block diagram of a system within which aspects of the present embodiments may be implemented.

In describing the various embodiments of the present disclosure, certain terminology is used herein for convenience only and should not be considered as limiting such embodiments. In the drawings, the same reference numerals are employed for designating the same elements throughout the several figures and the present description.

Referring to the drawings, there is shown in FIG. 1 a block diagram of an example of a system in which various aspects and embodiments can be implemented. System 100 may be embodied as a device including the various components described below and is configured to perform one or more of the aspects described in this application. Examples of such devices, include, but are not limited to, various electronic devices such as personal computers, laptop computers, smartphones, tablet computers, digital multimedia set top boxes, digital television receivers, personal video recording systems, connected home appliances, and servers. Elements of system 100, singly or in combination, may be embodied in a single integrated circuit, multiple ICs, and/or discrete components. For example, in at least one embodiment, the processing and encoder/decoder elements of system 100 are distributed across multiple ICs and/or discrete components. In various embodiments, the system 100 is communicatively coupled to other systems, or to other electronic devices, via, for example, a communications bus or through dedicated input and/or output ports. In various embodiments, the system 100 is configured to implement one or more of the aspects described in this application.

The system 100 includes at least one processor 110 configured to execute instructions loaded therein for implementing, for example, the various aspects described in this application. Processor 110 may include embedded memory, input output interface, and various other circuitries as known in the art. The system 100 includes at least one memory 120 (e.g., a volatile memory device, and/or a non-volatile memory device). System 100 includes a storage device 140, which may include non-volatile memory and/or volatile memory, including, but not limited to, EEPROM, ROM, PROM, RAM, DRAM, SRAM, flash, magnetic disk drive, and/or optical disk drive. The storage device 140 may include an internal storage device, an attached storage device, and/or a network accessible storage device, as non-limiting examples.

System 100 includes an encoder/decoder module 130 configured, for example, to process data to provide an encoded video or decoded video, and the encoder/decoder module 130 may include its own processor and memory. The encoder/decoder module 130 represents module(s) that may be included in a device to perform the encoding and/or decoding functions. As is known, a device may include one or both of the encoding and decoding modules. Additionally, encoder/decoder module 130 may be implemented as a separate element of system 100 or may be incorporated within processor 110 as a combination of hardware and software as known to those skilled in the art.

Program code to be loaded onto processor 110 or encoder/decoder 130 to perform the various aspects described in this application may be stored in storage device 140 and subsequently loaded onto memory 120 for execution by processor 110. In accordance with various embodiments, one or more of processor 110, memory 120, storage device 140, and encoder/decoder module 130 may store one or more of various items during the performance of the processes described in this application. Such stored items may include, but are not limited to, the input video, the decoded video or portions of the decoded video, the bitstream, matrices, variables, and intermediate or final results from the processing of equations, formulas, operations, and operational logic.

In several embodiments, memory inside of the processor 110 and/or the encoder/decoder module 130 is used to store instructions and to provide working memory for processing that is needed during encoding or decoding. In other embodiments, however, a memory external to the processing device (for example, the processing device may be either the processor 110 or the encoder/decoder module 130) is used for one or more of these functions. The external memory may be the memory 120 and/or the storage device 140, for example, a dynamic volatile memory and/or a non-volatile flash memory. In several embodiments, an external non-volatile flash memory is used to store the operating system of a television. In at least one embodiment, a fast external dynamic volatile memory such as a RAM is used as working memory for video coding and decoding operations, such as for MPEG-2, JPEG Pleno, MPEG-I, HEVC, or VVC.

The input to the elements of system 100 may be provided through various input devices as indicated in block 105. Such input devices include, but are not limited to, (i) an RF portion that receives an RF signal transmitted, for example, over the air by a broadcaster, (ii) a Composite input terminal, (iii) a USB input terminal, and/or (iv) an HDMI input terminal.

In various embodiments, the input devices of block 105 have associated respective input processing elements as known in the art. For example, the RF portion may be associated with elements suitable for (i) selecting a desired frequency (also referred to as selecting a signal, or band-limiting a signal to a band of frequencies), (ii) down converting the selected signal, (iii) band-limiting again to a narrower band of frequencies to select (for example) a signal frequency band which may be referred to as a channel in certain embodiments, (iv) demodulating the down converted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion may include a tuner that performs various of these functions, including, for example, down converting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, down converting, and filtering again to a desired frequency band. Various embodiments rearrange the order of the above-described (and other) elements, remove some of these elements, and/or add other elements performing similar or different functions. Adding elements may include inserting elements in between existing elements, for example, inserting amplifiers and an analog-to-digital converter. In various embodiments, the RF portion includes an antenna.

Additionally, the USB and/or HDMI terminals may include respective interface processors for connecting system 100 to other electronic devices across USB and/or HDMI connections. It is to be understood that various aspects of input processing, for example, Reed-Solomon error correction, may be implemented, for example, within a separate input processing IC or within processor 110 as necessary. Similarly, aspects of USB or HDMI interface processing may be implemented within separate interface ICs or within processor 110 as necessary. The demodulated, error corrected, and demultiplexed stream is provided to various processing elements, including, for example, processor 110, and encoder/decoder 130 operating in combination with the memory and storage elements to process the datastream as necessary for presentation on an output device.

Various elements of system 100 may be provided within an integrated housing. Within the integrated housing, the various elements may be interconnected and transmit data therebetween using suitable connection arrangement 115, for example, an internal bus as known in the art, including the I2C bus, wiring, and printed circuit boards.

The system 100 includes communication interface 150 that enables communication with other devices via communication channel 190. The communication interface 150 may include, but is not limited to, a transceiver configured to transmit and to receive data over communication channel 190. The communication interface 150 may include, but is not limited to, a modem or network card and the communication channel 190 may be implemented, for example, within a wired and/or a wireless medium.

Data is streamed to the system 100, in various embodiments, using a Wi-Fi network such as IEEE 802.11. The Wi-Fi signal of these embodiments is received over the communications channel 190 and the communications interface 150 which are adapted for Wi-Fi communications. The communications channel 190 of these embodiments is typically connected to an access point or router that provides access to outside networks including the Internet for allowing streaming applications and other over-the-top communications. Other embodiments provide streamed data to the system 100 using a set-top box that delivers the data over the HDMI connection of the input block 105. Still other embodiments provide streamed data to the system 100 using the RF connection of the input block 105.

The system 100 may provide an output signal to various output devices, including a display 165, speakers 175, and other peripheral devices 185. The other peripheral devices 185 include, in various examples of embodiments, one or more of a stand-alone DVR, a disk player, a stereo system, a lighting system, and other devices that provide a function based on the output of the system 100. In various embodiments, control signals are communicated between the system 100 and the display 165, speakers 175, or other peripheral devices 185 using signaling such as AV. Link, CEC, or other communications protocols that enable device-to-device control with or without user intervention. The output devices may be communicatively coupled to system 100 via dedicated connections through respective interfaces 160, 170, and 180. Alternatively, the output devices may be connected to system 100 using the communications channel 190 via the communications interface 150. The display 165 and speakers 175 may be integrated in a single unit with the other components of system 100 in an electronic device, for example, a television. In various embodiments, the display interface 160 includes a display driver, for example, a timing controller (T Con) chip.

The display 165 and speaker 175 may alternatively be separate from one or more of the other components, for example, if the RF portion of input 105 is part of a separate set-top box. In various embodiments in which the display 165 and speakers 175 are external components, the output signal may be provided via dedicated output connections, including, for example, HDMI ports, USB ports, or COMP outputs.

Point Cloud Data Format

Point cloud data is believed to consume a large portion of network traffic, e.g., among connected cars over 5G network, and immersive communications (VR/AR). Efficient representation formats are necessary for point cloud understanding and communication. In particular, raw point cloud data needs to be properly organized and processed for the purposes of world modeling and sensing. Compression on raw point clouds is essential when storage and transmission of the data are required in the related scenarios.

Furthermore, point clouds may represent a sequential scan of the same scene, which contains multiple moving objects. They are called dynamic point clouds as compared to static point clouds captured from a static scene or static objects. Dynamic point clouds are typically organized into frames, with different frames being captured at different times. Dynamic point clouds may require the processing and compression to be in real-time or with low delay.

Each point of the point clouds is represented at least by a 3D position (x, y, z). The set of the 3D positions illustrates the geometry of the object/scene that the point cloud is captured from. Additionally, each point of the point cloud can be associated with some attributes, depending on the applications. For example, for VR/AR/Gaming, the attribute includes color (r, g, b); and for LiDAR, the attribute includes reflectance.

Point Cloud Data Use Cases

The automotive industry and autonomous car are domains in which point clouds may be used. Autonomous cars should be able to "probe" their environment to make good driving decisions based on the reality of their immediate surroundings. Typical sensors like LiDARs produce (dynamic) point clouds that are used by the perception engine. These point clouds are not intended to be viewed by human eyes and they are typically sparse, not necessarily colored, and dynamic with a high frequency of capture. They may have other attributes like the reflectance ratio provided by the LiDAR as this attribute is indicative of the material of the sensed object and may help in making a decision.

Virtual Reality (VR) and immersive worlds have become a hot topic and foreseen by many as the future of 2D flat video. The basic idea is to immerse the viewer in an environment all around the viewer, as opposed to standard TV where the viewer can only look at the virtual world in front of the viewer. There are several gradations in the immersivity depending on the freedom of the viewer in the environment. Point cloud is a good format candidate to distribute VR worlds. They may be static or dynamic and are typically of average size, for example, no more than millions of points at a time.

Point clouds may also be used for various purposes such as culture heritage/buildings in which objects like statues or buildings are scanned in 3D to share the spatial configuration of the object without sending or visiting it. Also, it is a way to ensure preserving the knowledge of the object in case it may be destroyed, for instance, a temple by an earthquake. Such point clouds are typically static, colored, and huge.

Another use case is in topography and cartography in which using 3D representations, maps are not limited to the plane and may include the relief. Google Maps is now a good example of 3D maps but uses meshes instead of point clouds. Nevertheless, point clouds may be a suitable data format for 3D maps and such point clouds are typically static, colored, and huge.

World modeling and sensing via point clouds could be an essential technology to allow machines to gain knowledge about the 3D world around them, which is crucial for the applications discussed above.

3D point cloud data are essentially discrete samples on the surfaces of objects or scenes. To fully represent the real world with point samples, in practice it requires a huge number of points. For instance, a typical VR immersive scene contains millions of points, while point clouds typically contain hundreds of millions of points. Therefore, the processing of such large-scale point clouds is computationally expensive, especially for consumer devices, e.g., smartphone, tablet, and automotive navigation system, that have limited computational power.

The first step for any processing or inference on the point cloud is to have efficient storage methodologies. To store and process the input point cloud with affordable computational cost, one solution is to down-sample it first, where the down-sampled point cloud summarizes the geometry of the input point cloud while having much fewer points. The down-sampled point cloud is then fed to the subsequent machine task for further consumption. However, further reduction in storage space can be achieved by converting the raw point cloud data (original or down sampled) into a bitstream through entropy coding techniques for lossless compression.

In addition to lossless coding, many scenarios seek lossy coding for a significantly improved compression ratio while maintaining the induced distortion under certain quality levels. To achieve a less lossy coding, an efficient point feature extractor is necessary to improve the accuracy of the reconstruction within the given resource budget.

Learning-Based Point Cloud Compression

Since point cloud data is composed of two components: geometry information and attribute information, the compression of point clouds can be classified into two categories: geometry coding and attribute coding.

Examples of existing learning-based point cloud geometry compression techniques are deep octree coding, end-to-end feature-based geometry coding. With deep octree coding, neural network-based models are utilized to estimate the occupancy probabilities. Such estimated probabilities are then used to help the arithmetic coder to encode or decode a binary flag indicating whether a child octree voxel is occupied or empty.

This work is closely related to the '144 application, which differs from the literature work when coding the tree structures for a point cloud in at least the following aspects:

1) The octree voxel occupancy probability is estimated using finer level of details. It is a bottom-up strategy.
2) In the proposed encoder, it not only encodes occupancy information (whether a voxel is occupied or not, also denoted as "occupancy status") into bitstream, but also encode features into bitstream that are extracted/aggregated based on information from the finer levels of the octree. Such features are used to assist the encoder to perform the arithmetic coding of the octree occupancy information.
3) In the proposed decoder, it first decodes the feature, and then decodes the octree occupancy information based on the decoded feature.

The encoding and decoding methods of the '144 application are described in more details below.

Encoding

Figure 2:
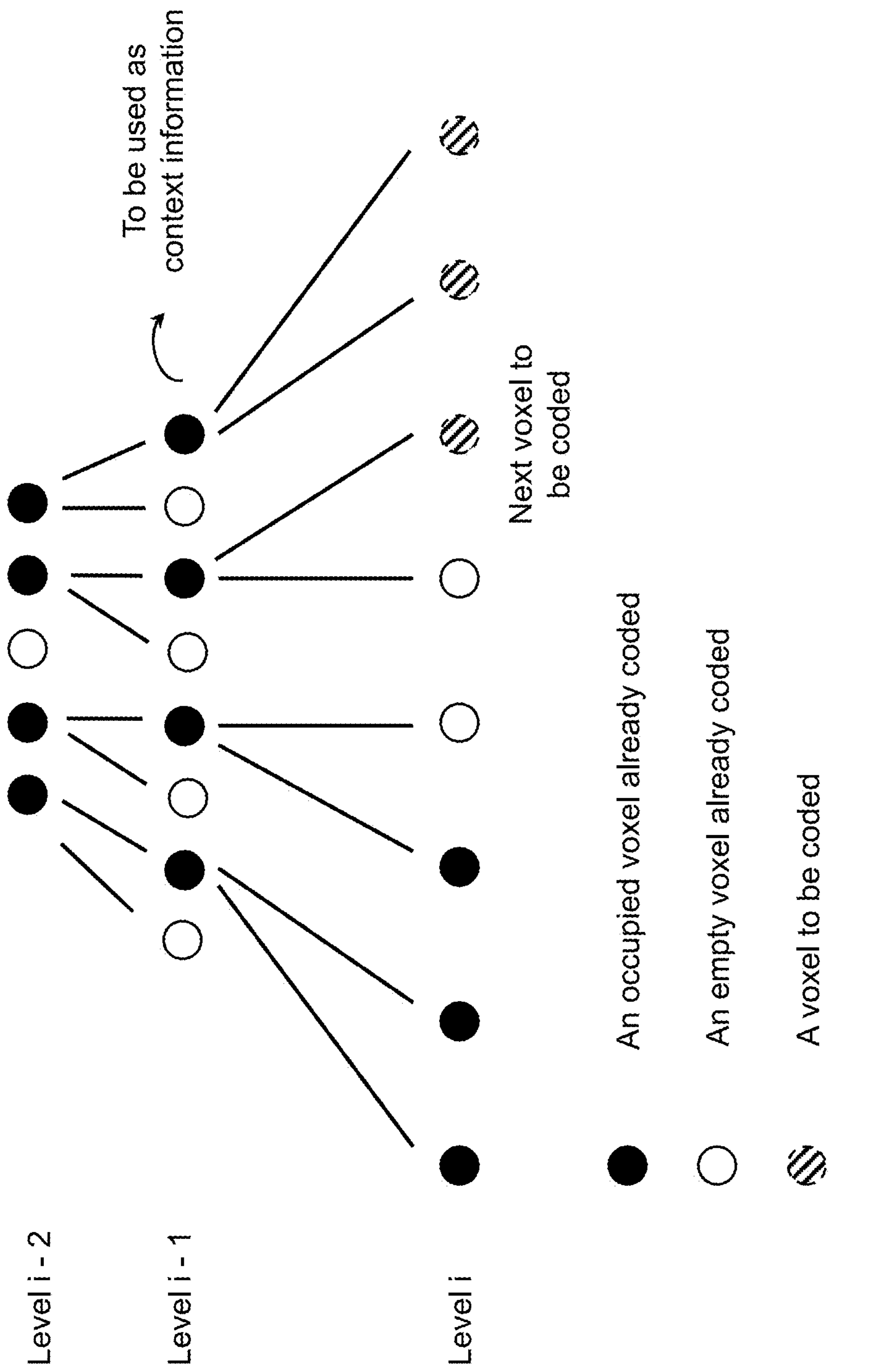
FIG. 2 illustrates voxels in different levels.

FIG. 2 illustrates a portion (level i−2, i−1, i) of an octree to be coded. In FIG. 2, we use a binary tree representing an octree for a point cloud for the purpose of simplifying the drawing.

Figure 3:
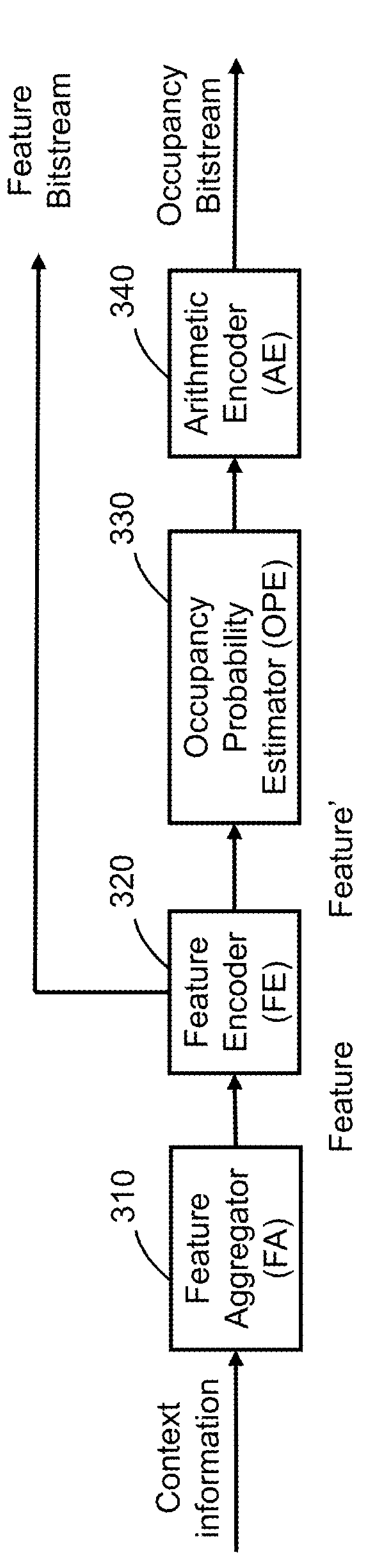
FIG. 3 illustrates octree encoding in a prior proposal.

FIG. 3 illustrates the encoding method of the '144 application. At 310, the encoder performs feature extractor/aggregator FA. Unlike the feature extractor in earlier methods where the input is from its parent level and maybe from the current level in addition, the feature extractor/aggregator in the '144 application uses the finer (child) level of details (and the same level) as its input. Because the finer level of voxels always has more detailed information comparing to voxels from a parent level, it is much easier to extract more representative features.

The feature encoder FE (320) encodes the generated features (Feature) into bitstreams. In addition to generating the bitstream, the feature encoder (320) also outputs the reconstructed feature (Feature'), that may not be exactly the same as the input feature (Feature). In one embodiment, the reconstructed feature (Feature') is a quantized/dequantized version of the input feature (Feature). The reconstructed feature (Feature') should match the decoded feature on a decoder.

The occupancy probability estimator (OPE, 330) uses a neural network model, which takes the reconstructed feature as its input and computes the occupancy probability of a current octree voxel. Based on the estimated probability, the arithmetic encoder (AE, 340) will encode the occupancy information of the current octree voxel into a bitstream.

Figure 4:
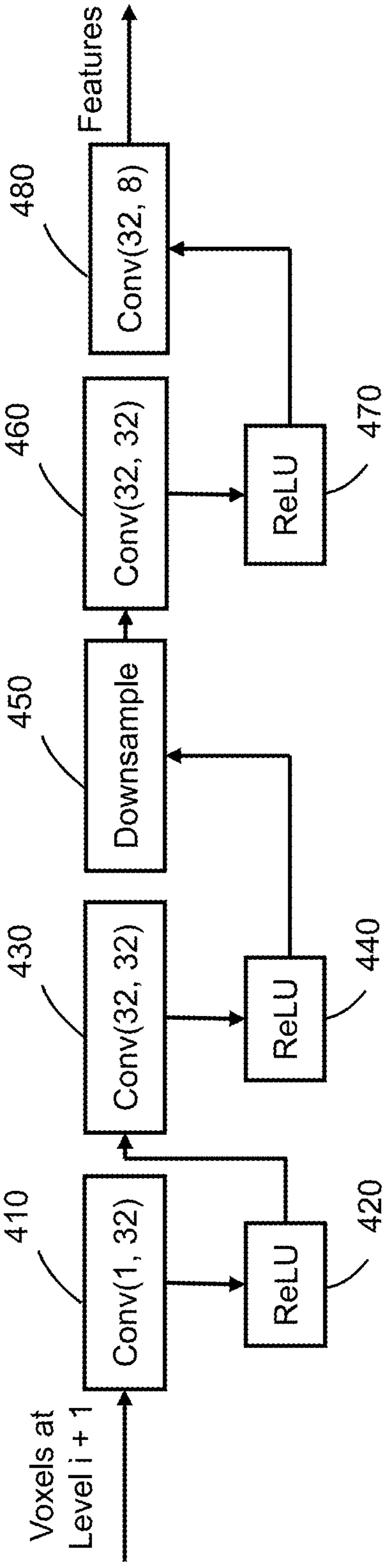
FIG. 4 illustrates feature aggregation.
Figure 5:
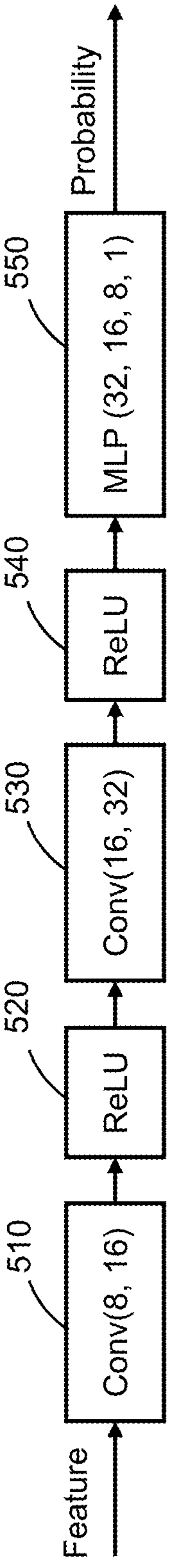
FIG. 5 illustrates occupancy probability estimator (OPE)

One possible design of the feature aggregator (FA, 310) is shown in FIG. 4. In this example design, the feature extractor just takes the immediate next level of voxels as input to extract features. In this design, the feature aggregator (FA) is composed of several 3D convolutional layers (with downsample), i.e., the "Conv" blocks (410, 430, 460, 480) in FIG. 4, where Conv (x, y) means the input feature channel size is x while the output feature channel size is y. All the convolutional layers, except for the last one, are appended by a ReLU activation function (420, 440, 470) to introduce non-linearity to the feature aggregation process. The "Downsample" block (450) is to downsample the feature from (i+1)-th to the i-th level. In more advanced embodiments, the convolutional layers can be replaced with other commonly used feature aggregation blocks, such as an Inception ResNet (IRN) block, and a Transformer block, and these blocks can be repeated several times to enhance the feature aggregation performance. The occupancy probability estimator (OPE) is shown in FIG. 5. Firstly, the feature is further aggregated/refined by a few convolutional layers (two Conv layers in the example of FIG. 5, 510 530), where a ReLU activation function (520, 540) is appended after each Conv layer to introduce non-linearity. After that, it is passed to a multilayer perceptron (MLP, 550) to finally compute the probability. In FIG. 5, the array (32, 6, 8, 1) after MLP indicates the channel size of the MLP layers. In the end, the occupancy probability is one scalar number, therefore the output channel of the MLP is one (1).

Decoding

Figure 6:
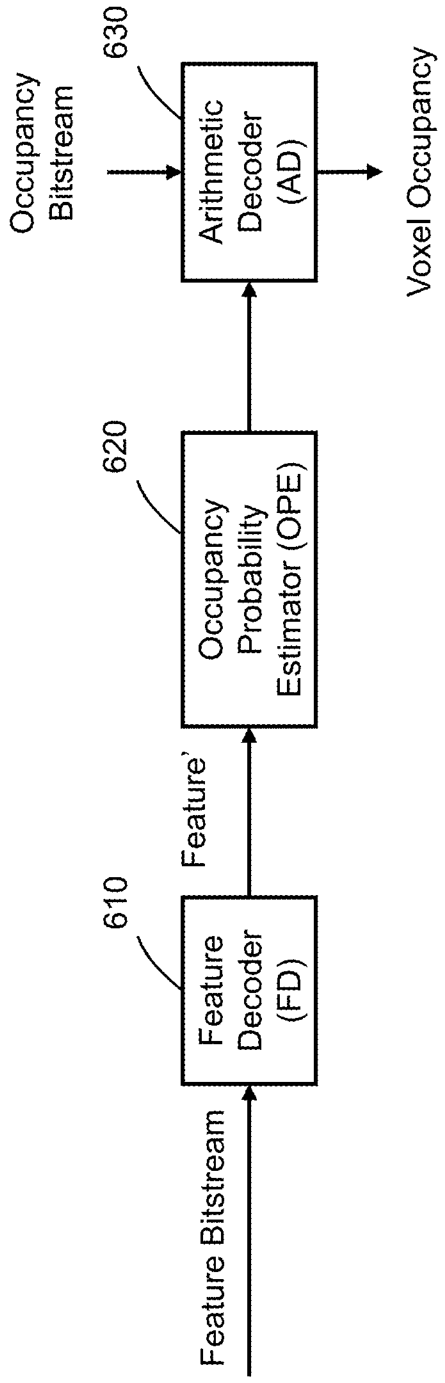
FIG. 6 illustrates octree decoding in a prior proposal.

The decoding method corresponding to the encoding method is illustrated in FIG. 6. The feature decoder (FD, 610) decodes a feature (Feature') from the input bitstream. Basically, the decoder relies on a coded feature rather than to extract the feature from scratch by itself. The proposed decoder benefits from a more representative feature as the features were extracted using a finer level of details than from the parent level as in the previous methods.

The occupancy probability estimator (OPE, 620) is the same as the occupancy probability estimator (OPE, 330) in the encoding method as illustrated in FIG. 3. It computes an occupancy probability of a next octree voxel. Based on the estimated probability, the arithmetic decoder (AD, 630) will determine if the next octree voxel is occupied or empty.

Overall Compression Framework

With the encoding and decoding methods described above, an overall compression framework can be constructed. Particularly, the above encoding and decoding methods can be concatenated with a feature-based coding method. It leads to an overall lossy point cloud compression solution as shown in FIG. 7 and FIG. 8.

Feature-Based Coding in the Full Compression Framework

Figure 7:
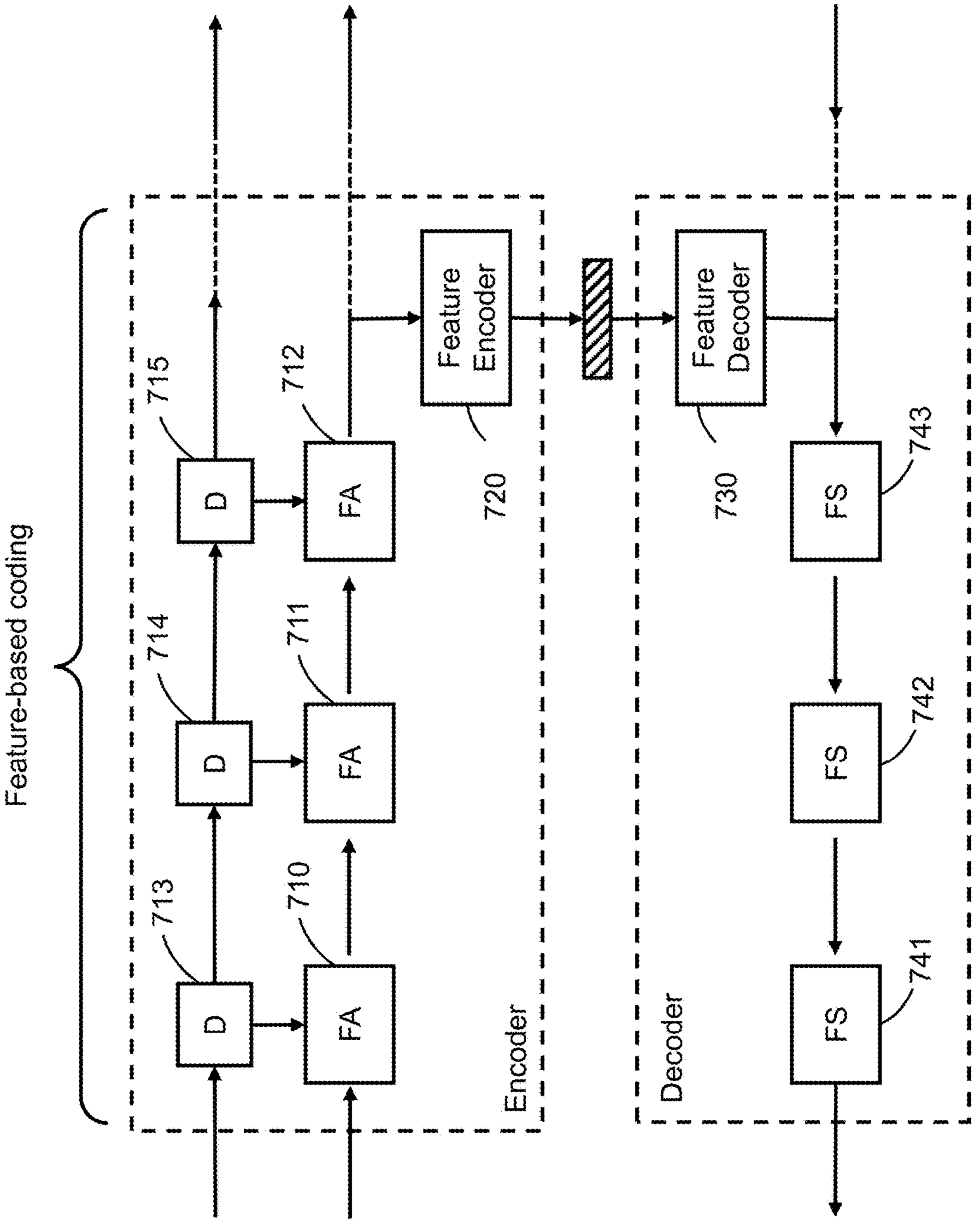
FIG. 7 illustrates feature coding in a prior proposal.
Figure 8:
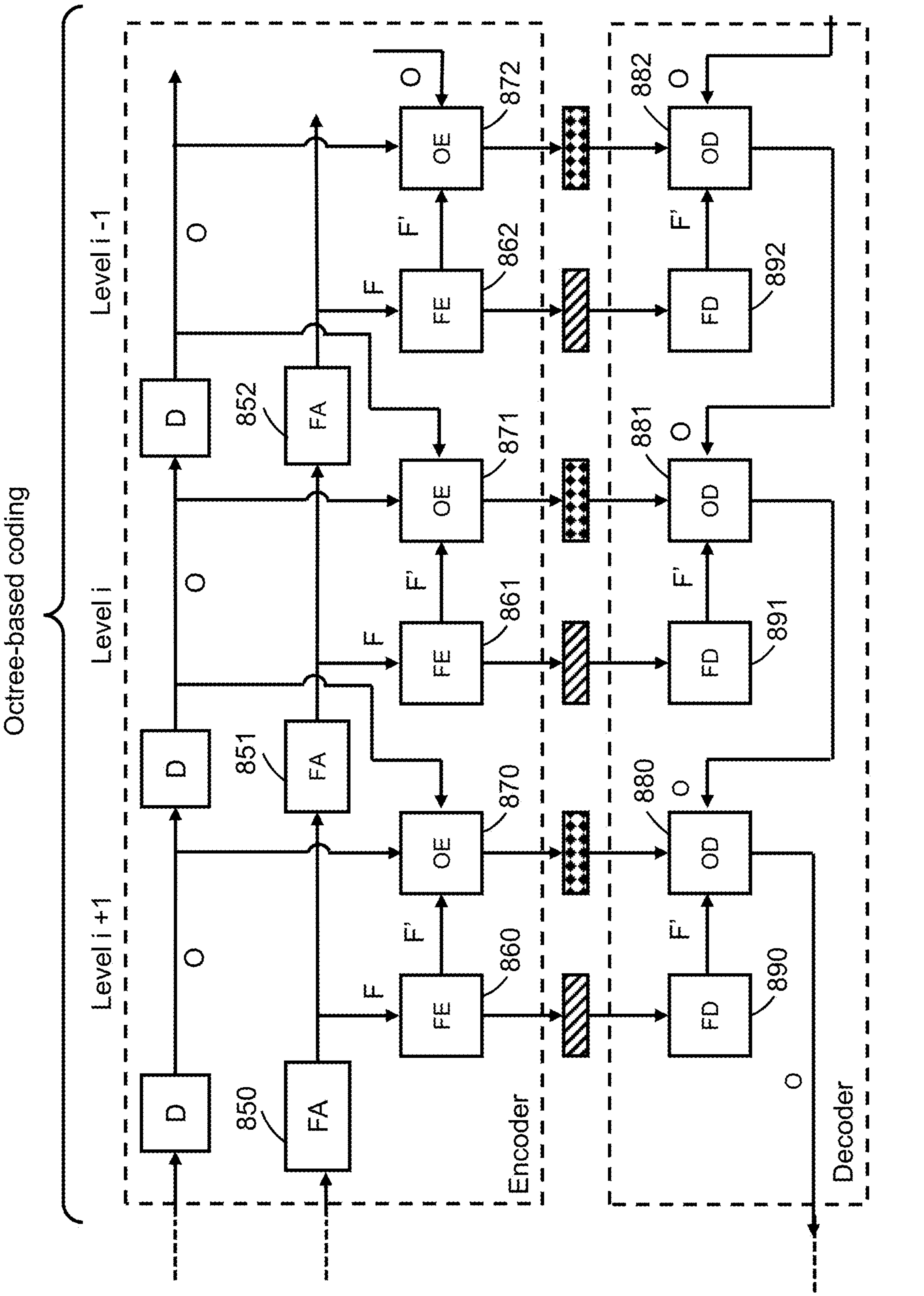
FIG. 8 illustrates octree coding in a prior proposal.

In the follows, we briefly describe the feature-based coding method as shown in FIG. 7.

The encoder is shown in the top part of FIG. 7. It has a few feature aggregation (FA) modules (710, 711, 712) to extract geometry features. They basically extract and aggregate a feature map from the input, for example, point cloud frames. During the feature extraction and aggregation with FA, the resolution of the input is typically downsampled via pooling or downsampling operations (713, 714, 715). Finally, the extracted feature is sent to a "Feature Encoder" (FE, 720) module to output a bitstream.

The decoder is shown in the bottom part of FIG. 7. A feature decoder (FD, 730) decodes the features from the bitstream. The decoder has a few feature synthesis (FS, 741, 742, 743) modules to reconstruct a point cloud. They correspond to FA modules (710, 711, 712) in the encoder.

Instead of performing downsampling/pooling, the FS modules reconstruct the input, e.g., point cloud, via upsampling/unpooling.

Figure 9:
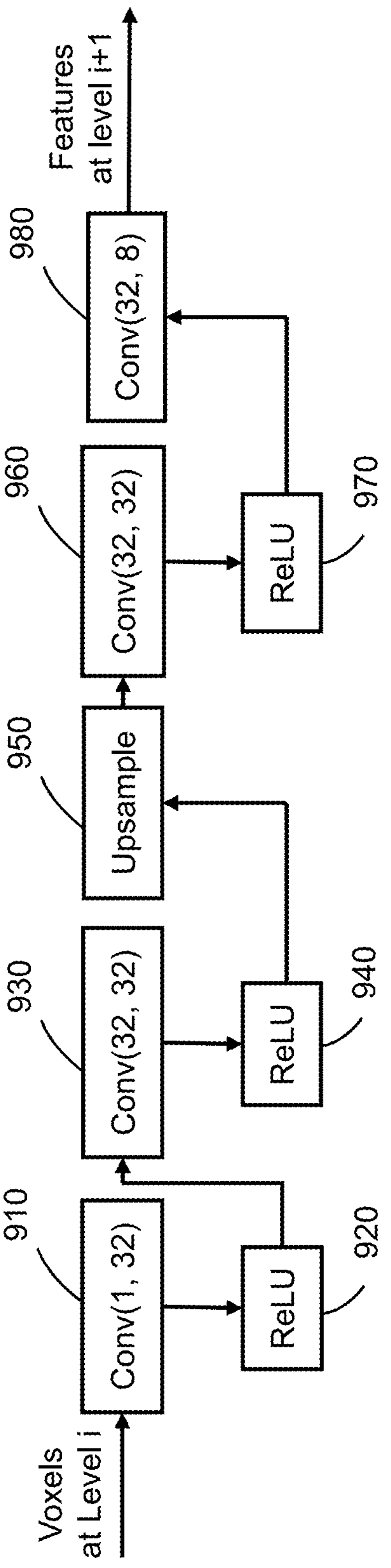
FIG. 9 illustrates feature upsample (FU), according to an embodiment.
Figure 10:
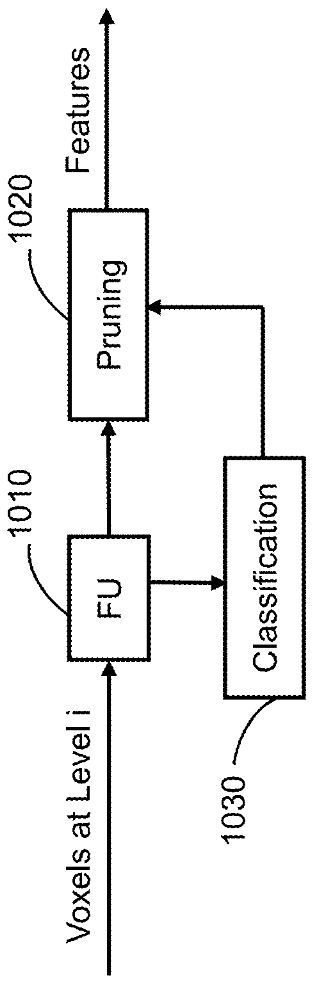
FIG. 10 illustrates feature synthesis (FS), according to an embodiment.

The design of the FS module is shown in FIG. 10. The FS module is built on top of another module that we call the feature upsample module (FU, 1010), as shown in FIG. 9. The FU module consists of a few convolution layers (910, 930, 960, 980) and an upsample module (950) inserted at the middle. All the convolutional layers, except for the last one, are appended by a ReLU activation function (920, 940, 970) to introduce non-linearity to the feature aggregation process. It aims at upsampling and aggregating the input feature to generate a feature vector for each voxel to be determined as occupied or unoccupied.

To build the FS module on top of the FU module, a classification module (1030) is appended to perform binary classification, which classifies the occupancy as occupied or not, and perform pruning (1020) to the output of FU (1010)—where the voxels that are classified as empty will be removed/pruned. The classification module (1030) typically contains a few MLP layers and it outputs the occupancy probabilities. The convolutional layers in the FU/FS modules can be enhanced or replaced by MLP or some other neural network modules, such as the Inception ResNet (IRN) or Transformer blocks.

Full Compression Framework with Lossless Coding

To have a full compression framework, the lossless encoding/decoding discussed above is used. In one example, FIG. 7 illustrates the portion of the feature-based coding while FIG. 8 illustrates the octree-based coding portion of the system.

We hereby focus on understanding the design of FIG. 8. First the feature aggregation (FA) blocks (850, 851, 852) are used during encoding and they consecutively down-sample the point cloud. This is a result that in the octree-based coding we discussed in FIG. 3 and FIG. 6, the features extracted by the FA modules are encoded by the FE modules (860, 861, 862) into bitstreams. In the methods earlier than the '144 application, the features are not coded. On decoder side, the feature is decoded by module FD (890, 891, 892). The decoded feature F' is used to assist the octree encoding OE (870, 871, 872) and octree decoding OD modules (880, 881, 882).

Also note that the direction to perform feature extraction by FA (850, 851, 852) is from left to right. It indicates that the feature extraction is based on a finer level of octree. Note all voxels in the current level may also be used since the encoder has access to the whole octree.

In an alternative design, the feature outputted for use at level i is generated with every voxel that are occupied at level i. In addition, features are also generated for non-occupied voxels if its parent voxel is occupied. These features are later used by octree encoding OE and octree decoding OD to compute the occupancy probabilities.

In the following, we propose a few improvements to our earlier work ('144 application), for example, in the following ways:

1. We introduce conditional coding to additionally remove the redundancy in the features to be encoded so as to reduce the bitstream size of the features. By applying conditional coding, on the encoder side, we encode the features based on a known condition; while on the decoder side, we decode the feature based on the same known condition. The known condition can be a prediction generated from previously encoded/decoded contents; it may also be a prediction generated from other reference point cloud frames. Using conditional coding, on the encoder side, the information that co-exists in both the feature to be encoded and the known condition can be removed/decoupled from the feature to be encoded, ending up with a smaller bitstream. On the decoder side, the co-existing information can be merged back to the feature from the known condition so that the decoding can proceed correctly.
2. At the same time, we introduce hierarchical feature coding with the hyperprior model to encode/decode the features so as to additionally reduce the bitstream size of the features;
3. We separate the dependencies across octree levels so that the training of the codec can be performed level-by-level, and the memory cost during training can be greatly reduced.

These improvements are also applicable to the feature-based coding for lossy point cloud coding, to be discussed later.

Proposed Octree Coding Method

Figure 11:
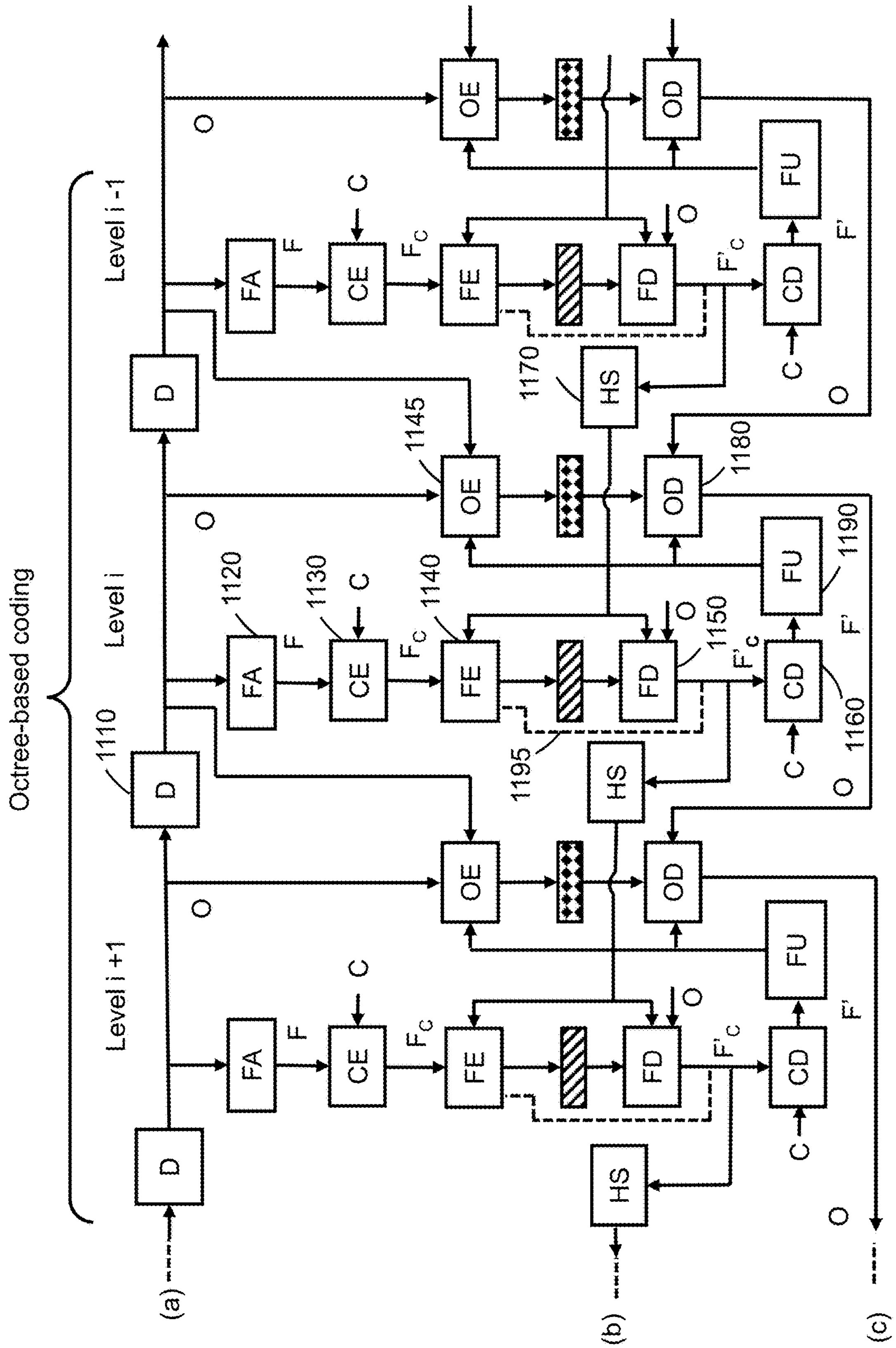
FIG. 11 illustrates octree coding, according to an embodiment.

FIG. 11 illustrates our proposed octree coding method, according to one embodiment. Compared to the earlier proposal, there are multiple updates. For illustrative purposes, let us focus on one level alone, for example, level i.

Encoding

Firstly, the downsample module D (1110) generates the octree at level i, which is to be coded, then the FA module (1120) directly extracts the feature F from the octree at level i, rather than extracting feature from the (i+1)-th level feature as in FIG. 8. In this way, there is no feature propagation from the finer levels. We note that the feature F for level i actually has coordinates aligned with the (i−1)-th level because there is one down-sampling in the FA block (see FIG. 4). In other words, the feature F for level i represents the geometry at level i but is at a coarser resolution of octree level (i−1).

After that, the feature F is passed to the conditional encoder (CE) module (1130), which is to further process the feature F based on a conditional feature C. The basic idea is that, suppose the network already has some information about the level i geometry, which is also available on both the encoder and the decoder, then there is no need to pass this information again from the encoder to decoder so that a smaller bitstream can be sent to describe the level i geometry. To achieve this, the conditional encoder (1130) is introduced to remove the known information from F, and the conditional feature C carries the commonly known information in both the encoder and the decoder. This is similar to the residual network design although the conditional encoder can be implemented as a neural network rather than simple arithmetic subtraction between F and C. We will provide more details about the conditional encoder CE later.

In one embodiment, the conditional feature C can be a feature aggregated/built from the already encoded/decoded octree, for example, using technologies described in an article by Fu, Chunyang, et al., entitled "Octattention: Octree-based large-scale contexts model for point cloud compression," Proceedings of the AAAI conference on artificial intelligence, Vol. 36. No. 1, 2022. We call the resulting feature an intra-predicted feature $C_{intra}$. This intra-predicted feature is derived from the ancestral octree levels that have already been encoded/decoded. It composes of the ancestral 3D positions, the octree level index, the ancestral octant binary code, etc. In another embodiment, the conditional feature C can be a feature aggregated with a previously reconstructed point cloud frame using technologies, for example, described in the '466 application). We call the resulting feature an inter-predicted feature $C_{inter}$. This inter-predicted feature is extracted from the reconstructed reference frame at a finer (or the same) level. In yet another embodiment, the conditional feature C can be the concatenation of both $C_{intra}$ and $C_{inter}$.

The obtained feature $F_C$ is then passed to feature encoder FE (1140) to obtain a feature bitstream representing the geometry at level i, then it is reconstructed by the feature decoder FD (1150), leading to the feature $F'_C$. Note that $F'_C$ is the reconstructed version of $F_C$ after quantization and then dequantization. The FD module also need to take the occupancy at level i−1 as the input so that the output $F'_C$ and the feature $F_C$ have the same coordinates which is the octree coordinates at level i−1. In another embodiment, to obtain $F'_C$ on the encoder, one may directly quantize then dequantize $F_C$ rather than going through the actual arithmetic decoding with FD to reduce computational cost.

Next, $F'_C$ is passed to the conditional decoder (CD, 1160) to obtain another feature F'. The conditional decoder is paired with the conditional encoder (CE, 1130), and the purpose of the CD module is to add back the commonly known information (carried by the conditional feature C) to the feature $F'_C$. Again, rather than performing an arithmetic addition, the CD module can be implemented with neural network layers that aggregates the input feature $F'_C$ and the conditional feature C to generate the output F'. We will discuss more about the CD module later. Note that F' is paired with F and can be viewed as the reconstruction of F. Although F' and F may not have the same number of channels, they should carry the same information and both represent the geometry at level i with the resolution at level i−1.

Next, F' is used to assist the coding of the octree at level i. As discussed earlier, the feature F' (and F) are both at the resolution of level i−1 though F' represents the geometry at level i. To assist the coding of octree level at level i, the feature F' is upsampled by the feature upsample module FU (1190). The FU module is shown in FIG. 9. After the FU module (1190), every voxel to be coded will be associated with a feature vector for estimating the occupancy probability. Next, we operate in the same manner as the '144 application (FIG. 3). Particularly, based on the output of FU, the octree encoder (1145) performs arithmetic encoding for each voxel to be coded, and outputs the occupancy bitstream. In the end, both the feature bitstream and the occupancy bitstream will be sent to the decoder. We also note that the encoding of the feature Fe at level i is based on the $F'_C$ at the level i−1. Particularly, we estimate the hyper-parameter (e.g., variance and optionally, mean) with a hyperprior synthesis (HS) module (1170) using the $F'_C$ at the level i−1 as input. The output of the HS module will guide the arithmetic encoding/decoding of the FE and FD module. We note that the HS module to code the Fe at level i also need to take the occupancy at level i−1 as the input so that the output hyper-parameters have coordinates aligned with $F_C$ at level i. We ignore that input to HS in the figures for simplicity. With this design, we essentially form a hierarchical coding structure for the feature $F_C$. That is, to encode/decode the Fe at the current level, the earlier reconstructed $F'_C$ at the previous level is in used. This design aims to fully utilize the already coded feature at the previous level to help the coding of the newly generated feature at the current level.

The encoding then proceeds level-by-level, from the coarser level to the finer level, until the last octree level is reached. Then all the feature bitstreams and the occupancy bitstreams will be sent to the decoder. For the case that the point cloud is coded in the lossy manner, the hyperprior parameters ((b) in FIG. 11) will also need to be output for the lossy encoding.

Decoding

Compared to the encoding process, the decoding is relatively simple. We again focus on the decoding of level i. First, with the feature bitstream at level i and the already reconstructed occupancy O at level i−1, the feature $F'_C$ is firstly reconstructed by the feature decoder FD (1150). We note that the feature decoder needs the hyper-parameters generated by the HS module (1170) to perform the decoding.

Next, the feature $F'_C$ is fed to the conditional decoder CD (1160) to reconstruct the feature F' with the conditional feature C. The conditional feature C being used by the decoder should be the same one as the one used by the encoder. Then the feature upsampling module FU (1190) is used to upsample F' so that a feature map at level i is generated to facilitate the decoding of the occupancy at level i. With the occupancy bitstream as well as the output of FU, now the occupancy at level i can be decoded by the occupancy decoder OD (1180).

The decoding then proceeds level-by-level, from the coarser level to the finer level, until the last octree level is reached. Then the occupancy at the last level will be output as the reconstructed point cloud. For the case that the point cloud is coded in the lossy manner, the hyperprior parameters ((b) in FIG. 11) will also need to be outputted for the lossy decoding.

Figure 12:
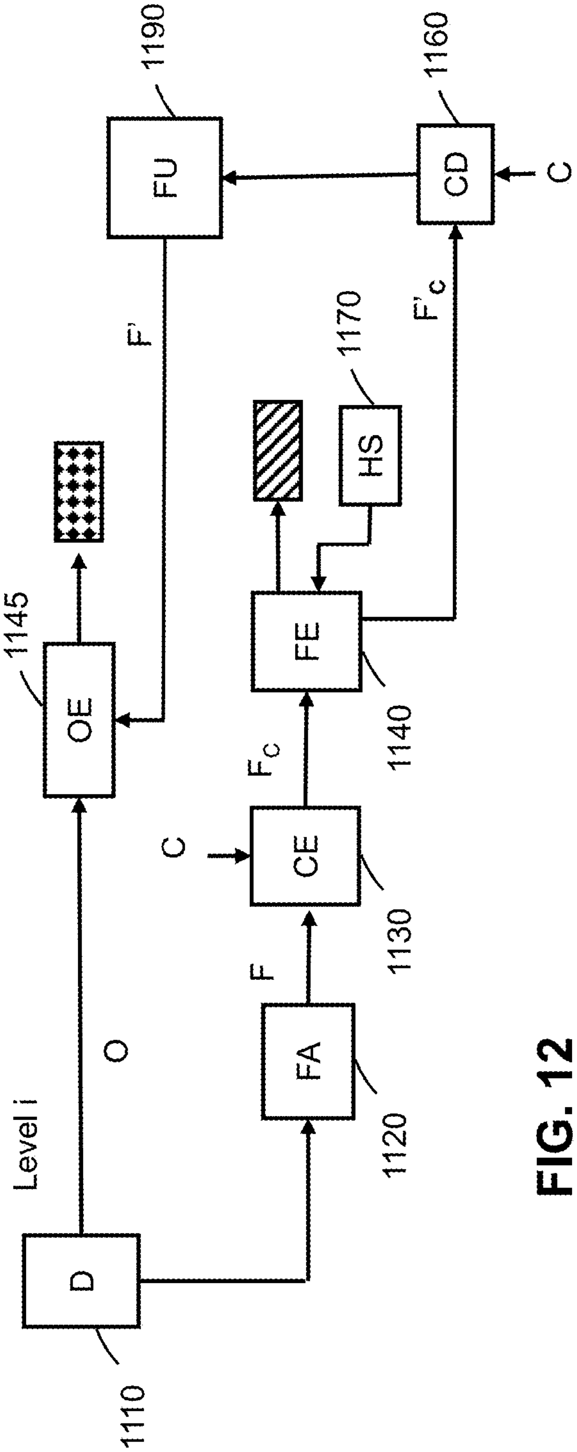
FIG. 12 illustrates encoding for level i, according to an embodiment.
Figure 13:
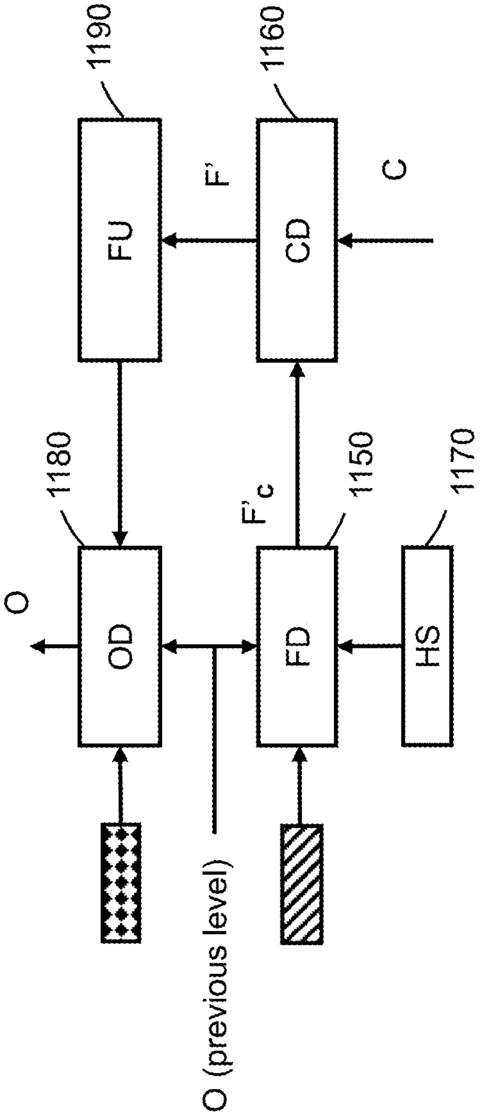
FIG. 13 illustrates decoding for level i, according to an embodiment.

Here, for simplicity for the drawing, we assume the encoder and decoder are implemented in the same device, and thus, the encoder can share the same FD, CD, FU, HS modules (1150, 1160, 1190, 1170) with the decoder. When the encoder and decoder are implemented separately, these modules will be implemented separately for the encoder and decoder. In fact, in a simplified design, during encoding, the feature encoder FE directly output the reconstructed feature $F'_C$ by quantization and then dequantization so CD can be launched right after FE during encoding via the connection 1195. FIG. 12 and FIG. 13 illustrate such an encoder and decoder, respectively for level i.

Figure 14:
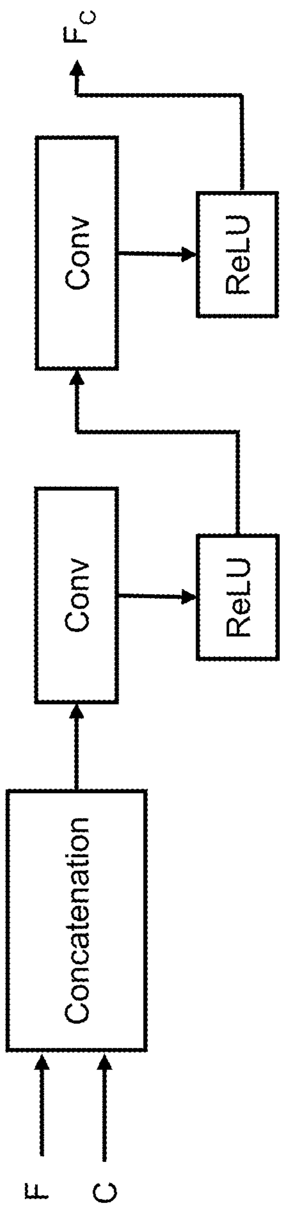
FIG. 14 illustrates a conditional encoder (CE), according to an embodiment.
Figure 15:
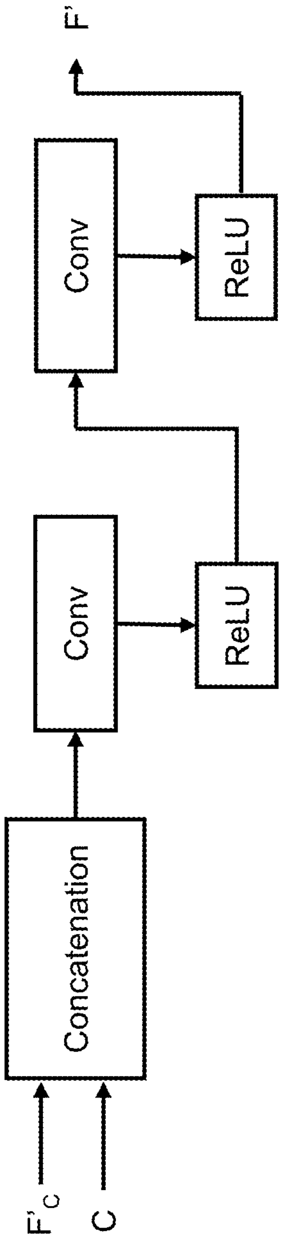
FIG. 15 illustrates a conditional decoder (CD), according to an embodiment.

Conditional encoder (CE) and conditional decoder (CD): FIG. 14 and FIG. 15 provide the design of the conditional encoder and conditional decoder, respectively, according to an embodiment. Here the "Conv" denotes a convolutional layer, and it can be replaced by other more advanced designs such as the Inception ResNet (IRN) or Transformer blocks. Essentially the conditional encoder and conditional decoder share the similar high-level design, they both aim at aggregating the input features (F on the conditional encoder and $F'_C$ on the conditional decoder) based on the conditional feature C.

Figure 16:
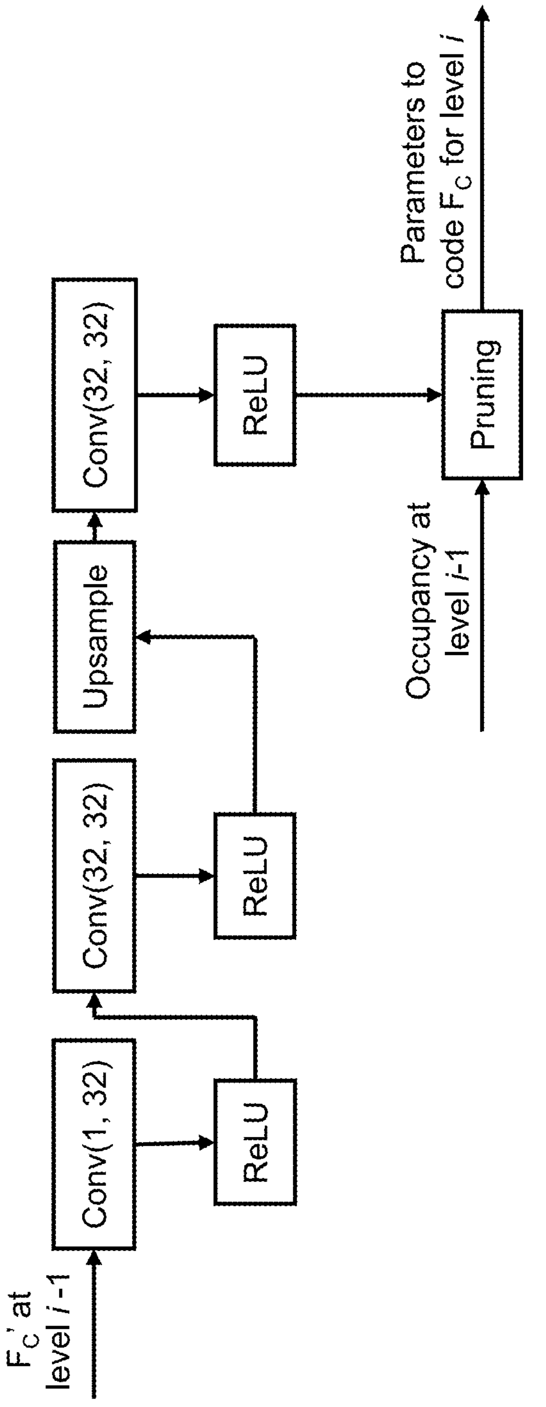
FIG. 16 illustrates hyperprior synthesis (HS), according to an embodiment.

Hyperprior synthesis (HS): The hyperprior synthesis module is shown in FIG. 16, according to an embodiment. Its design is similar to the FS or FU modules in FIG. 9 and FIG. 10. However, it takes the occupancy O at level i−1 as an additional input so that the output tensor has coordinates aligned with the $F_C$ at level i. We hereby remind that the Fe at level i actually is at the resolution of level i−1 although it represents the occupancy at level i. Additionally, different from FS module, the output are probability distribution parameters such as variance and mean to assist the arithmetic coding of $F_C$. The method to use those generated parameters for arithmetic coding is the same as the one described in an article by Ballé, Johannes, et al., entitled "Variational image compression with a scale hyperprior," in International Conference on Learning Representations, 2018. Again, the convolutional layers in FIG. 16 can be replaced by more advanced design such as IRN and Transformer blocks.

Proposed Feature-Based Coding Method

Figure 17:
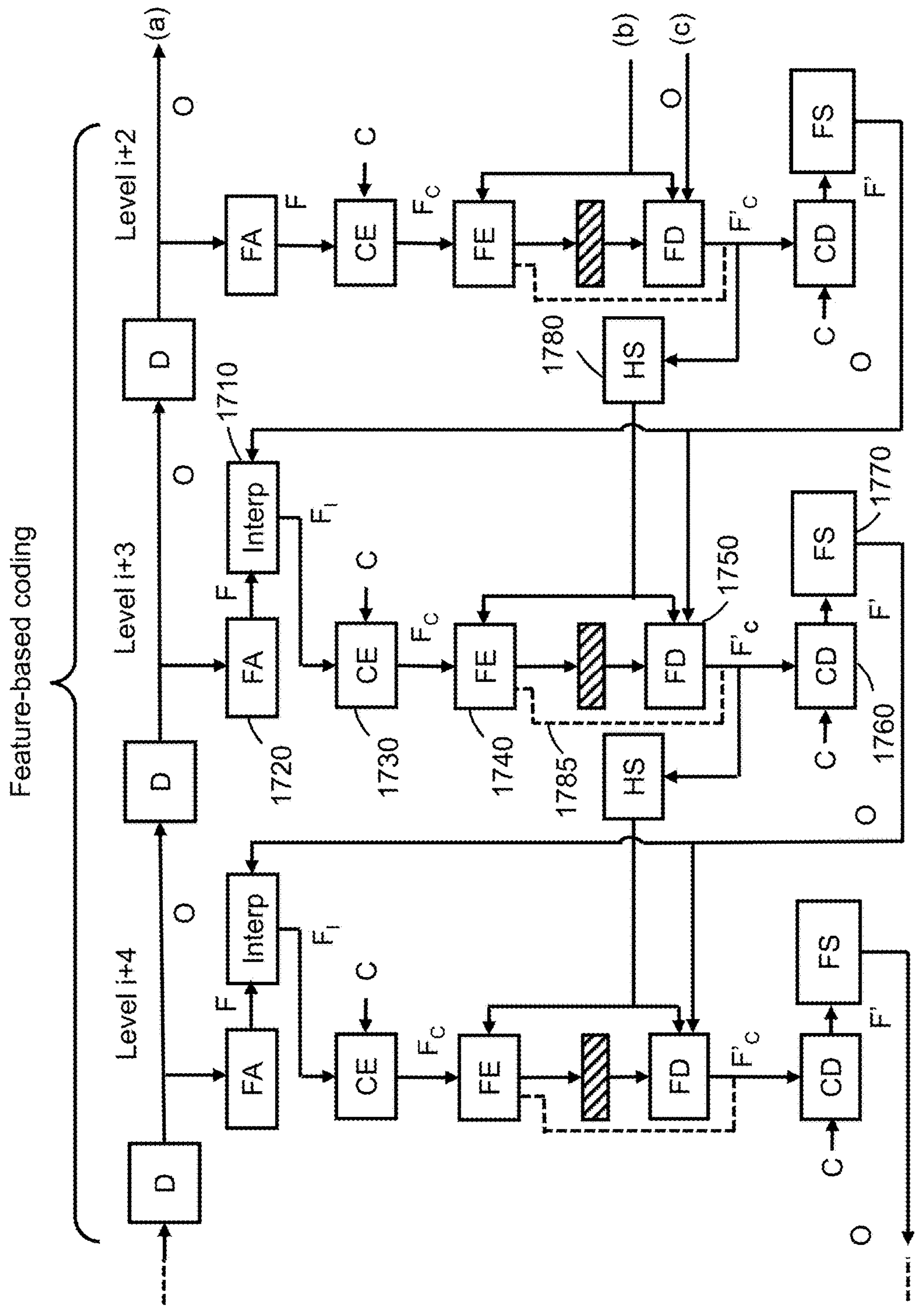
FIG. 17 illustrates feature coding, according to an embodiment.

Our proposed method for octree coding can be generalized to the case of feature-based coding for lossy point cloud compression, as shown in FIG. 17, according to an embodiment. Similarly, to code the octree at level i, a feature at the resolution of level i−1 will be generated and encoded with conditional coding and hyperprior synthesis. Differently, there is no need to generate the occupancy bitstream as in the lossless coding case in FIG. 11. Additionally, an interpolation module (1710) needs to be put in place on the encoder to align the coordinate of the feature for decoding because the coordinate on the decoder is lossy.

By connecting the (a) (b) and (c) in FIG. 11 with the (a) (b) and (c) in FIG. 17, a complete lossy point cloud compression system can be constructed.

Encoding

For illustrative purposes, we focus on the level i+3 in FIG. 17 to describe the encoding method. First, given the octree at level i+3 (output by D module), the binary occupancy status at level i+3 is fed to the FA module (1720) to extract the feature F. Similarly to the octree coding case, feature F represents the octree geometry of level i+3 but is at the resolution of level i+2 because of the downsampling in the FA module.

Next, since we are operating in lossy mode, the ground-truth octree coordinates of feature F, i.e., the octree level i+2 is unknown to the decoder. In fact, on the decoder side, it only has a lossy reconstructed version of the octree level i+2. Therefore, in order to send the F to the decoder, we interpolate the feature F given the lossy reconstructed octree level at i+2. This corresponds to the connection from the FS module at level i+2 to the module "Interp" at level i+3. The interpolation module "Interp" (1710) takes F and the lossy reconstruction at previous level as inputs and generates a feature $F_I$ that is aligned with the lossy reconstruction at the previous level.

We briefly describe the details of the interpolation module here. There exist different designs of the interpolation module. In one embodiment, it can be implemented by a few convolutional layers (or other more advance processing blocks) module to preprocess the input feature F, followed by a targeted convolution layer where the target coordinates are specified to be the lossy reconstruction octree occupancy at level i+2. The output of the target convolution layer gives the interpolated feature $F_I$.

Next, similar to the octree coding discussed before, the interpolation module output $F_I$ is passed to the conditional encoding (CE, 1730), then with feature encoding (FE, 1740)), feature decoding (FD, 1750), and conditional decoding (CD, 1760), a feature F' is obtained and a feature bitstream is also generated by the FE module. Again, the feature decoding may be skipped because $F'_C$ is essentially the quantized and then de-quantized version of $F_C$. Thus, one may directly quantize $F_C$ to get $F'_C$. Therefore, CD can be launched right after FE during encoding via the connection 1785. The feature F' can be viewed as the reconstruction of $F_I$. They both carry the information about the geometry of level i+3, and they have the same coordinates, though their number of channels may not be the same.

Feature F' is then fed to the feature synthesis (FS, 1770) module (FIG. 10) for upsampling, classification, and pruning. It outputs the lossy reconstructed geometry O at level i+3. It will be provided as the input for the encoding of the next level, the level i+4.

We additionally note that at level i+2, the interpolation module is not needed because the level i+1 (see FIG. 11) is losslessly encoded so the coordinates of F and F' at level i+2 can be aligned without taking extra care.

The encoding then proceeds level-by-level, from the coarser level to the finer level, until the last octree level is reached. Then all the feature bitstreams will be sent to the decoder.

Decoding

The decoding procedure is simpler. We again focus on the level i+3 for illustration. First, the FD module (1750) is launched with the feature bitstream, the geometry at level i+2, and the estimated hyper parameters from HS (1780) as inputs. The FD module outputs the reconstructed feature $F'_C$, then $F'_C$ is fed to the conditional decoding module (CD, 1760), leading to the feature F'. By feeding the feature F' to the FS module (1770), the reconstructed lossy geometry at level i+3 is obtained. This reconstructed lossy geometry will be served as the input for the decoding of the next level, level i+4.

The decoding then proceeds level-by-level, from the coarser level to the finer level, until the last octree level is reached. Then the occupancy at the last level will be output as the lossy reconstructed point cloud.

Simplification

In another embodiment, the feature-based coding described above can be simplified, as shown in FIG. 18. Again, by connecting the (a) (b) and (c) in FIG. 11 with the (a) (b) and (c) in FIG. 18, a complete lossy point cloud compression system can be constructed.

Figure 18:
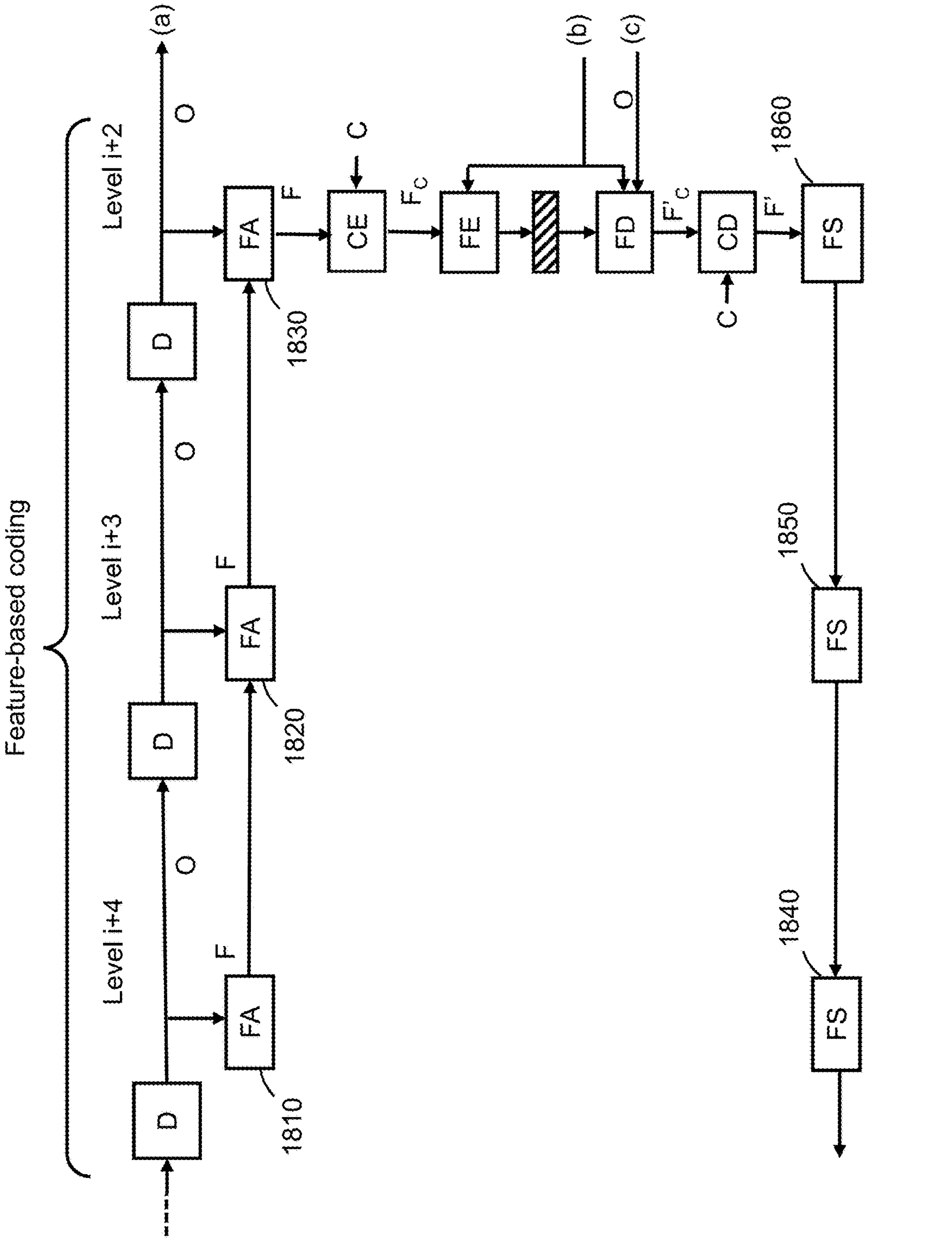
FIG. 18 illustrates simplified feature coding, according to an embodiment.

In FIG. 18, instead of coding the octree level-by-level and generating bitstreams for each level, it uses only one bitstream to represent the octree levels. Particularly, it launches the FA modules (1810, 1820, 1830) consecutively to extract a feature F to represents the all the finer geometry in the levels associated with feature-based coding, then the feature F is encoded in a similar manner as described earlier.

On the decoder side, it launches the FS modules (1840, 1850, 1860) consequently to upsample and refine the generated point cloud until the last level of the point cloud is reached. With this design, only one bitstream is generated and the computational cost is reduced.

We note that the simplification shown in FIG. 18 and the design in FIG. 17 can be combined. In this embodiment, on the encoder side, the FA module can be launched multiple times consecutively (1810, 1820, 1830) in the same way as shown in FIG. 18, then starting from a certain level, let say, level j, it generates bitstreams level-by-level, in the same manner shown in FIG. 17. On the decoder side, the design is symmetric to the encoder, where several bitstreams are decoded with individual conditional decoders and FS modules up to the j-th level. Then after that, the FS modules are launched several times consecutively (1840, 1850, 1860) to reconstruct the point cloud. More generally, different levels of a point cloud can be partitioned into several subsets of consecutive levels, wherein some subsets generate bitstreams level-by-level and other subsets use the simplified approach.

Parameter Sharing

In the design of FIG. 11, FIG. 17, and FIG. 18, the FA blocks on the encoder side may have similar architectures, and the FU blocks on the decoder side may also have similar architectures (note that there is a FU block inside the FS block). Such similarity of network architecture motivates us to propose the following:

1) Let all the FA blocks on the encoder side to share the same set of network parameters;

2) Let all the FU blocks on the decoder side (including those embedded inside the FS blocks) to share the same set of network parameters. Moreover, the classification block in the FS and the OPE can also be shared. Additionally, all the HS blocks in the codec can be shared.

Without the proposed model sharing, the feature-based coding and octree-based coding needs two sets of separate neural network parameters. It not only makes the overall parameter size larger but also requires retraining and reloading of the neural network parameters when the bottleneck level separating feature-based coding and octree-based coding is changed.

With this proposed embodiment, the feature-based (lossy) coding and octree-based (lossless) coding are additionally unified under the same set of encoder and decoder pairs. During inference, the codec can be reconfigurable while maintaining the conformance/compatibility using the same set of neural network parameters. The configuration of the codec such as the number of levels to be encoded as lossy, can be signaled as a high-level syntax to the decoder.

Point-Based Network Support

Our proposal supports the encoding and decoding of point cloud under voxel representation by utilizing convolutional layers. However, this design may not be well-suited for sparse point clouds such as LiDAR point clouds. In this embodiment, we discuss how to let our proposal to also support the encoding/decoding of sparse point clouds using point-based networks. Note that this is specifically for lossy coding with point-based network. The block diagram is provided in FIG. 19, according to an embodiment. Again, by connecting the (a) (b) and (c) in FIG. 19 with the (a) (b) and (c) in FIG. 17, a complete lossy point cloud compression system can be constructed. Whether the system will be operated with voxel-based lossy coding (e.g., FIG. 17 and FIG. 18) or point-based lossy coding (FIG. 19) can be signaled as a high-level syntax to the decoder.

Figure 19:
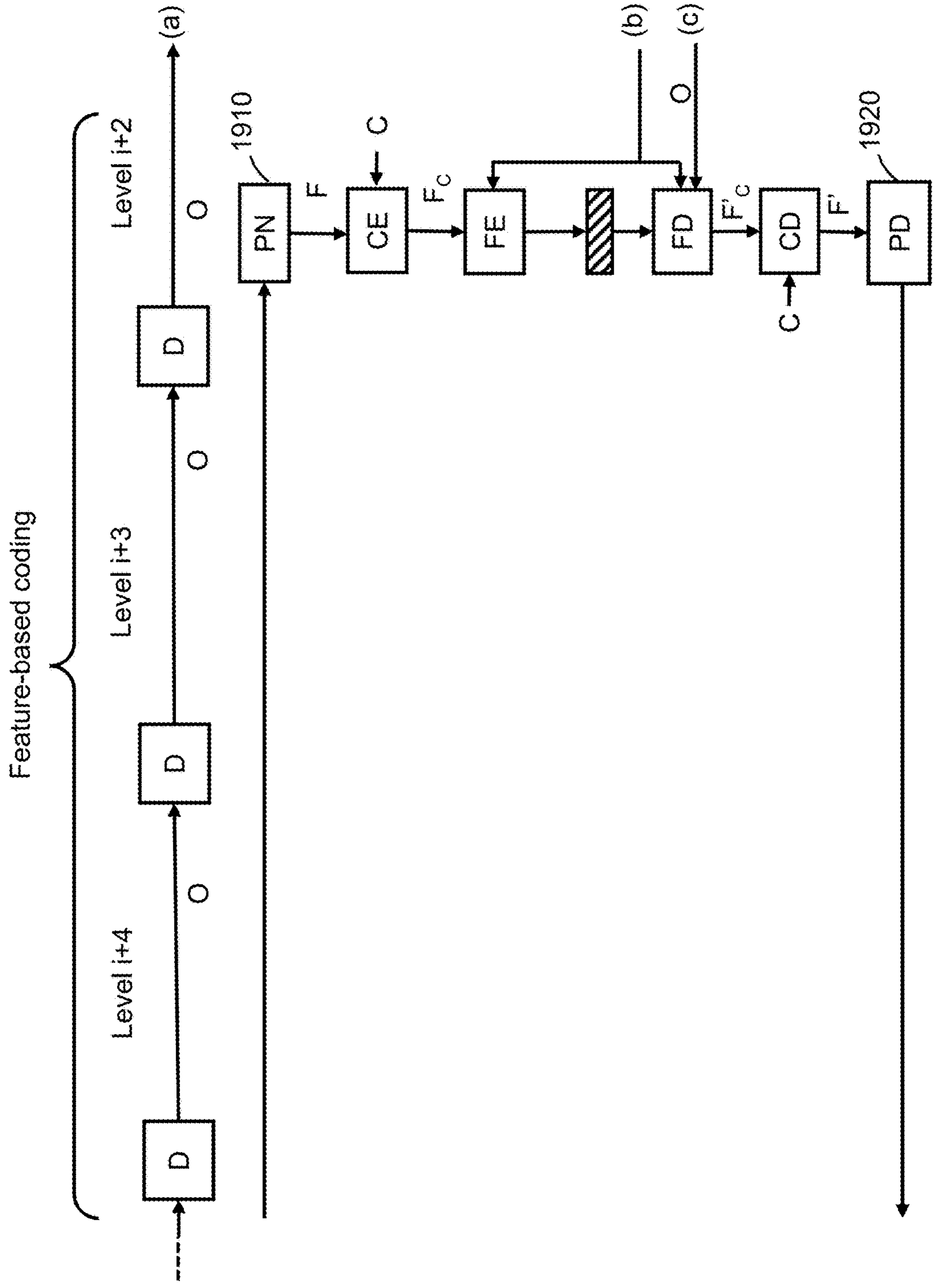
FIG. 19 illustrates feature coding with point-based network, according to an embodiment.

In FIG. 19, PN is a point-based network (1910) for feature extraction from a point cloud. It takes the original point cloud as input and directly output a feature map F. In one embodiment, the PN takes the typical PointNet design as described in an article by Qi, Charles R., et al. entitled "Pointnet: Deep learning on point sets for 3d classification and segmentation," Proceedings of the IEEE conference on computer vision and pattern recognition, 2017. It can also be replaced by any other point-based network for feature aggregation. On the decoder side, The PD module (1920) is a point-based decoder module. It directly outputs the decoded point cloud based on the feature F'. In one embodiment, the PD module can be the simple LatentGAN design which simply consists of a series of MLP layers. It can also be replaced by any other point-based decoder for point cloud generation.

Style Control

Our proposal can be combined with our earlier work ('987 application) to achieve a network model that can perform finer-grain rate control. Under the same rationale, it can be extended to support more advanced functionalities, such as supporting both intra coding and inter coding using the same set of model parameters. We call this embodiment the style control because it enables the codec to work under different desired styles/conditions.

Style Encoding and Adaptive Affine

Figure 20:
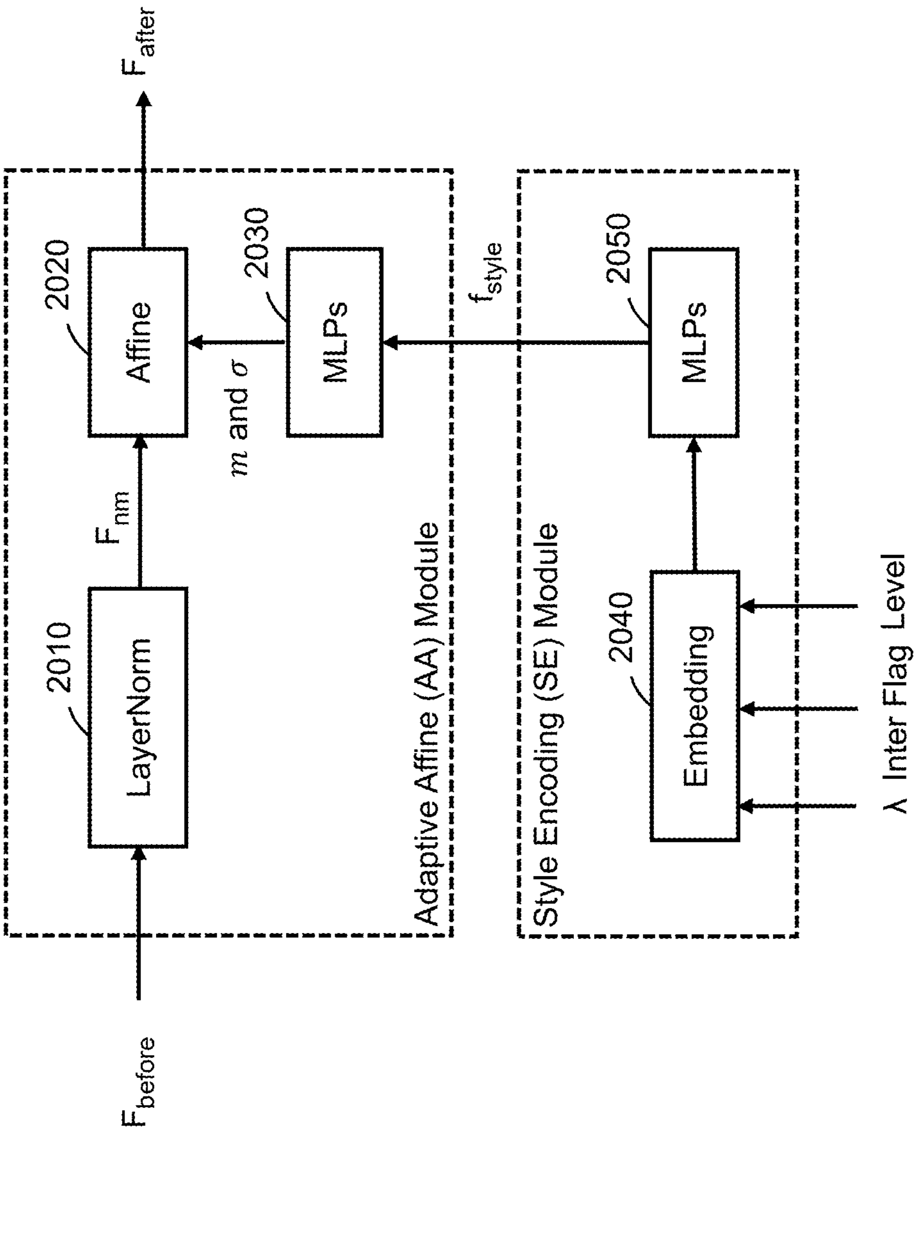
FIG. 20 illustrates an adaptive affine (AA) module with Style Encoding (SE), according to an embodiment.

The key to this embodiment is the adaptive affine (AA) module, discussed in '987 application, and also provided at the top of FIG. 20. In this embodiment, the AA module works together with another module that we call the style encoding module (SE), as shown at the bottom of FIG. 20.

The SE modules may take several different inputs. It can be computed only once during the whole encoding or during the whole decoding period. When finer-grain rate control with a set of single network parameters is needed, the R-D tradeoff parameter $\lambda$ chosen by the user need to be provided as an input to SE. Here a smaller $\lambda$ corresponds to a higher-quality decoded point cloud but a higher bitrate, and vice versa.

Additionally, if it is desired to use only one set of network parameters to work with both inter/intra coding cases, then a binary flag indicating intra (0) or inter (1) needs to be passed to SE. The level index of the current octree level being encoded/decoded can also be optionally passed to the SE module; in this case, the SE module needs to be launched per-level rather than just one time during encoding/decoding because every different octree level will have a different input to SE.

The SE module uses an embedding module (2040) to compute an embedding for the inputs, where the embedding module can have different designs, e.g., the positional embedding used by Transformers, or simply concatenates the original input. In an embodiment, the embedding module may apply positional embedding to $\lambda$, then concatenate with the binary inter flag and the index of the current level to obtain a raw representation of the style. After that, a few MLP layers (2050) are appended to output a feature vector that we call the style feature $f_{style}$. Again, note that when the current level is included, the SE module needs to be computed per-level because every level has a different style feature vector $f_{style}$.

Next, the style feature will be fed to the adaptive affine (AA) module described in the '987 application, which is to adaptively process an input feature map $F_{before}$ and output the processed/affined feature $F_{after}$. The AA module first apply a layer normalization (2010) to the input leading to the normalized feature $F_{nm}$, then with the input $f_{style}$, it computes a new mean m and variance o with a few MLP layers (2030). Then an affine module (2020) is applied to the normalized feature $F_{nm}$ via scaling and shifting, so that it output a feature $F_{after}$ with mean m and variance o.

Style Control with Adaptive Affine Modules

Figure 21:
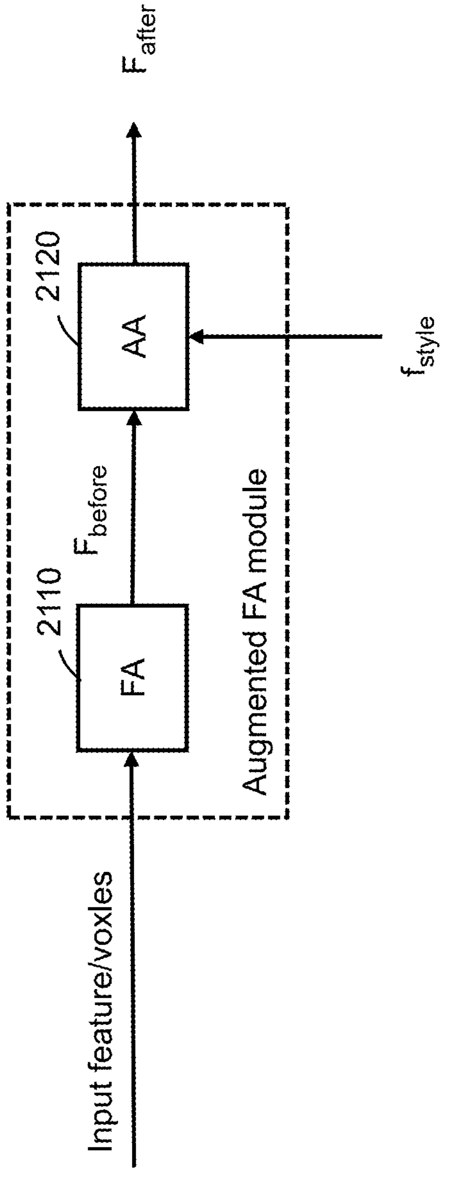
FIG. 21 illustrates an augmented FA module with an AA module inside it, according to an embodiment.

To apply the style control, at least a module on the encoder and at least a module in the decoder need to be augmented by an AA module. FIG. 21 shows an example of augmenting the FA module (2110) with the AA module (2120), which simply appends an AA module after the FA module. The augmented FA module takes not only its original input but also additionally $f_{style}$ associated to it as the input. When the octree level, say, level i, is used to compute $f_{style}$, then this $f_{style}$ is used to feed to all the AA modules operating at the octree level i. In another embodiment, the AA module may also be applied before the FA module to form the augmented FA module. In the same manner, other modules described in our work can be augmented by the AA module.

In one embodiment, to apply style control to the octree coding of FIG. 11, the neural network modules FA, CE, CD, FU, and HS are all augmented by inserting individual AA modules inside them. In another embodiment, to apply style control to the feature coding of FIG. 17, the neural network modules FA, CE, CD, FS and HS are all augmented by individual AA modules inside them. Similarly, it can be applied to the feature coding of FIG. 18 and FIG. 19. In general, the augmentation with the AA module can be applied to one or more neural network modules in our work.

To have effective style control, at the very least, one module on the encoder should be augmented by the AA module, and one module on the decoder should be augmented by the AA module. The more AA modules are inserted, the more effective the style control will become. However, more computational cost will be involved.

We note that with this embodiment, it is possible to achieve rate control for individual octree level by providing different desired λ parameters to different levels. In one embodiment when constructing a full point cloud coding system, we can set a particular λ parameter to the octree coding part (FIG. 11) and set another λ parameter to the feature-coding part (e.g., FIG. 17) so as to have flexible rate control of the feature between lossy and lossless coding.

We also note that in the case of having a single set of parameters for intra and inter coding, when the network works in the intra mode, in addition to setting the flag to SE to be intra (0), the inter-predicted feature $C_{inter}$ may set to be a constant feature, e.g., a feature with all ones.

Training Strategy

The training of our codec is also briefly described below. It follows a stochastic training strategy.

Training of Octree Coding Network

We hereby discuss the training of our octree coding network of FIG. 11. In one training iteration, rather than performing loss computation and backpropagation for the whole network, we randomly choose an octree level and only focus on the training of that particular octree level—this strategy can greatly reduce the memory consumption during training. In fact, in the earlier design shown in FIG. 8, to train at a particular level, the FA module needs to be launched many times only to obtain the feature at that level. Differently, by using our proposal in FIG. 11, the FA module only needs to be launched once to obtain the feature F for a particular level. That is because our design eliminates the dependency between different levels, which again, greatly reduces the memory consumption.

To perform the training at one octree level, in an example, our work first computes the rate of the feature $F_C$ (denoted by R) estimated by the hyperprior model. We also compute the cross entropy (or distortion) loss between the OPE probability estimation output and the ground-truth occupancy, denoted by D. The overall loss is given by $L_{lossless}=D+\lambda\cdot R$, where λ is the R-D trade off parameter.

Training of Feature Coding Network

We hereby discuss the training of our lossy coding network of FIG. 17. Similar to the training strategy of octree coding, we also randomly choose an octree level and only focus on the training of that particular level. To perform the training at one octree level, our work first computes the rate of the feature $F_C$ (denoted by R) estimated by the hyperprior model. We also compute the cross entropy (or distortion) loss between the FS classification output and the ground-truth occupancy, denoted by D. The overall loss is given by $L_{lossy}=D+\lambda\cdot R$, where λ is the R-D trade off parameter.

In addition to one-level training, it is also beneficial to train more than one-level in one iteration such as two-level training. In this case, we randomly choose two consecutive octree levels, e.g., level k and k−1, then we compute the rates incur by them (denoted by $R_k$ and $R_{k-1}$, respectively), as well as the distortions incurred by them (denoted by $D_k$ and $D_{k-1}$, respectively). Then the overall loss is given by $L_{lossy}=(D_k+D_{k-1})+\lambda\cdot(R_k+R_{k-1})$. Training more than one consecutive octree levels enables the network model to learn to balance the rate allocation between different levels and leads to better overall R-D performance.

Others

To train a model sharing neural network parameters for both the case of octree coding and feature-based coding, in one training iteration, we randomly configure the network to either the case of octree coding, or feature-based coding. For instance, with a probability of 0.6, the network would be configured as an octree coder to perform a training iteration. And with a probability of 0.4, the network would be configured as a feature-based coder to perform a training iteration.

To train a model sharing neural network parameters for both the case of inter coding and intra coding, in one training iteration, we randomly configure the network to either work in the inter mode (with the inter/intra flag being 1) or in the intra mode (with the inter/intra flag being 0). For instance, with a probability of 0.8, the network would be configured to work in the inter mode for a training iteration. And with a probability of 0.2, the network would be configured in the intra mode for training. The SE module introduced in style control needs to take the corresponding inter/intra flag as input during training.

To train a model that can support rate control, the R-D tradeoff parameter λ in the training loss and the λ fed to the style control should be the same number. Additionally, to enable a more stable training, the training is divided into two stages. At the first stage, we always choose a very small λ (e.g., $\lambda<10^{-6}$) for training. The first stage lasts for a few epochs such as 10 epochs. The first stage training is to provide a warm start for the neural network, letting it to only focus on learning good reconstructions.

In the second stage, we randomly choose a different λ for each training iteration where λ is chosen from a predefined range that is desired for the network to operate at, e.g., $\lambda\in[0.001, 2]$. The second stage training starts after the first stage training and continues until the end. The second stage training is to enable the network to adapt itself to different requirements of λ-learning to achieve different R-D tradeoffs.

One or more embodiments provide a computer program comprising instructions which when executed by one or more processors cause such processors to perform the encoding and/or decoding methods according to any of the embodiments described above. One or more embodiments also provide a computer readable storage medium having stored thereon instructions for encoding or decoding point cloud data according to the methods described above.

One or more embodiments provide a computer readable storage medium having stored thereon point cloud data generated according to the methods described above. One or more embodiments also provide a method and apparatus for transmitting or receiving point cloud data generated according to the methods described above.

The embodiments described herein may be implemented in, for example, a method or a process, an apparatus, a software program, a data stream, or a signal. Even if only discussed in the context of a single form of implementation (e.g., as a method), the implementation of such features may also be implemented in other forms. An apparatus may be implemented in, for example, appropriate hardware, software, and firmware. Corresponding methods may be implemented in, for example, a processor.

Various numeric values are used in the present application. Such specific values are for example purposes and the embodiments described are not limited to these specific values.

Various methods are described herein, and such methods comprise one or more steps or actions for achieving the described method. Unless a specific order of steps or actions is required for the proper operation of the method, the order and/or use of specific steps and/or actions may be modified or combined. Additionally, terms such as “first”, “second”, etc. may be used in various embodiments to modify an element, component, step, operation, etc., for example, a “first decoding” and a “second decoding”. Use of such terms does not imply an order to the operations unless specifically required.

The present disclosure may refer to “determining” various pieces of information. Determining information may include one or more of, for example, estimating, calculating, predicting, or retrieving (e.g., from memory) the information.

The present disclosure may refer to “accessing” various pieces of information. Accessing information may include one or more of, for example, receiving, retrieving (e.g., from memory), storing, moving, copying, calculating, determining, predicting, or estimating the information. Similarly, the present disclosure may refer to “receiving” various pieces of information. Receiving information may include one or more of, for example, accessing or retrieving (e.g., from memory) the information.

It is to be understood that use of any of the following “/”, “and/or”, and “at least one of” is intended to encompass all possible selections of listed items, taken either individually or in any combination thereof.

While specific embodiments have been described in the foregoing description in connection with the accompanying drawings, it should be understood that embodiments described herein are examples only and should not be taken as limiting the scope of the present disclosure or the following claims. Although features and elements are described herein in particular combinations, those of ordinary skill in the art will appreciate that such features or elements may be used alone or in any combination with the other features and elements. It is understood, therefore, that the overall teachings of the present disclosure are not limited to the particular embodiments, implementations, and examples disclosed herein, but are intended to cover variations, modifications, and alternatives as defined by the appended claims and any and all equivalents thereof.

The invention claimed is:

1. A method of encoding geometry of a point cloud, comprising:

determining a first feature representing a voxel occupancy status of at least one of a current level and one or more finer levels of the point cloud, based on the voxel occupancy status of the at least one of the current level and the one or more finer levels;

determining a second feature representing prediction of the voxel occupancy status of the at least one of the current level and the one or more finer levels of the point cloud;

determining a third feature associated with the voxel occupancy status of the at least one of the current level and the one or more finer levels, based on the first feature and the second feature; and encoding the third feature.

2. The method of claim 1, wherein the first feature is directly determined from the current level.

3. The method of claim 1, wherein the first feature is obtained at a last level of feature-based coding by applying feature extraction consecutively on levels associated with the feature-based coding.

4. The method of claim 1, wherein the determining the first feature is performed for each level of the point cloud based on a respective neural network, and wherein the respective neural networks are based on a same architecture and share a same set of network parameters.

5. The method of claim 1, wherein the determining the first feature is performed for the point cloud based on a point-based neural network.

6. The method of claim 1, wherein the current level corresponds to a level in the point cloud that is encoded with tree-based coding or a level in the point cloud that is encoded with feature-based coding.

7. The method of claim 1, wherein the obtaining the first feature comprises:

obtaining a feature and a reconstructed version of a previously reconstructed level; and interpolating the feature to obtain the first feature based on the reconstructed version.

8. The method of claim 1, wherein the point cloud includes a first set of consecutive levels of the point cloud and a second set of consecutive levels of the point cloud, the second set of consecutive levels including a final level of the point cloud, wherein the encoding the third feature is performed for each level of the first set of consecutive levels and is not performed for any level of the second set of consecutive levels, and the obtaining the first feature is performed for each level of the first and second sets of consecutive levels.

9. A method of decoding geometry of a point cloud, comprising:

decoding a first feature associated with a voxel occupancy status of at least one of a current level and one or more finer levels;

determining a second feature representing prediction of the voxel occupancy status of the at least one of the current level and the one or more finer levels of the point cloud; and determining a third feature representing the voxel occupancy status of the at least one of the current level and the one or more finer levels of the point cloud, based on the first feature and the second feature.

10. The method of claim 9, wherein the determining the first feature is performed for the point cloud based on a point-based neural network.

11. The method of claim 9, wherein the current level corresponds to a level in the point cloud that is decoded with tree-based coding or a level in the point cloud that is decoded with feature-based coding.

12. The method of claim 9, wherein the point cloud includes a first set of consecutive levels of the point cloud and a second set of consecutive levels of the point cloud, the second set of consecutive levels including the final level of the point cloud, wherein the decoding the first feature is performed for each level of the first set of consecutive levels and is not performed for any level of the second set of consecutive levels, and the obtaining the first feature is performed for each level of the first and second sets of consecutive levels.

13. The method of claim 9, further comprising:

obtaining a reconstructed feature from the third feature;

upsampling the reconstructed feature to obtain a feature vector for each voxel of the current level;

determining an occupancy probability based on a corresponding feature vector for a current voxel to be encoded; and decoding the current voxel based on the occupancy probability.

14. The method of claim 13, wherein the reconstructed feature is obtained at a last level of the point cloud by applying upsampling consecutively on levels associated with feature-based coding.

15. An apparatus for encoding geometry for a point cloud, comprising one or more processors and at least one memory coupled to the one or more processors, wherein the one or more processors are configured to:

determine a first feature representing a voxel occupancy status of at least one of a current level and one or more finer levels of the point cloud, based on the voxel occupancy status of the at least one of the current level and the one or more finer levels;

determine a second feature representing prediction of the voxel occupancy status of the at least one of the current level and the one or more finer levels of the point cloud;

determine a third feature associated with the voxel occupancy status of the at least one of the current level and the one or more finer levels, based on the first feature and the second feature; and encode the third feature.

16. The apparatus of claim 15, wherein the first feature is directly determined from the current level.

17. The apparatus of claim 15, wherein the first feature is obtained at a last level of feature-based coding by applying feature extraction consecutively on levels associated with the feature-based coding.

18. An apparatus for decoding geometry for a point cloud, comprising one or more processors and at least one memory coupled to the one or more processors, wherein the one or more processors are configured to:

decode a first feature associated with a voxel occupancy status of at least one of a current level and one or more finer levels;

determine a second feature representing prediction of the voxel occupancy status of the at least one of the current level and the one or more finer levels of the point cloud; and determine a third feature representing the voxel occupancy status of the at least one of the current level and the one or more finer levels of the point cloud, based on the first feature and the second feature.

19. The apparatus of claim 18, wherein the determining the first feature is performed for the point cloud based on a point-based neural network.

20. The apparatus of claim 18, wherein the current level corresponds to a level in the point cloud that is decoded with tree-based coding or a level in the point cloud that is decoded with feature-based coding.

* * * * *